(12) United States Patent
Christiansen et al.

(10) Patent No.: US 11,845,689 B2
(45) Date of Patent: Dec. 19, 2023

(54) LOCALLY STRENGTHENED GLASS-CERAMICS AND METHODS OF MAKING THE SAME

(71) Applicant: CORNING INCORPORATED, Corning, NY (US)

(72) Inventors: Kirk Wegner Christiansen, Horseheads, NY (US); Qiang Fu, Painted Post, NY (US); Petr Gorelchenko, Painted Post, NY (US); Aniello Mario Palumbo, Painted Post, NY (US); Michael S Pambianchi, Madison, NJ (US); Erick Franklin VanDuyne, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 681 days.

(21) Appl. No.: 17/040,323

(22) PCT Filed: Apr. 9, 2019

(86) PCT No.: PCT/US2019/026541
§ 371 (c)(1),
(2) Date: Sep. 22, 2020

(87) PCT Pub. No.: WO2019/199791
PCT Pub. Date: Oct. 17, 2019

(65) Prior Publication Data
US 2021/0024406 A1    Jan. 28, 2021

Related U.S. Application Data

(60) Provisional application No. 62/654,675, filed on Apr. 9, 2018.

(51) Int. Cl.
| | | |
|---|---|---|
| *C03C 10/00* | (2006.01) | |
| *B65D 1/02* | (2006.01) | |
| *C03B 32/02* | (2006.01) | |

(52) U.S. Cl.
CPC ........ *C03C 10/0027* (2013.01); *B65D 1/0207* (2013.01); *C03B 32/02* (2013.01); *C03C 2204/00* (2013.01); *Y10T 428/131* (2015.01)

(58) Field of Classification Search
CPC . C03C 10/0027; C03C 2204/00; C03C 3/097; C03B 32/02; B65D 1/0207; B65D 1/40; A47G 19/00; Y10T 428/131
See application file for complete search history.

(56) References Cited

U.S. PATENT DOCUMENTS

| | | |
|---|---|---|
| 4,039,310 A | 8/1977 | Sipe et al. |
| 4,315,573 A | 2/1982 | Bradley et al. |
| | (Continued) | |

FOREIGN PATENT DOCUMENTS

| | | |
|---|---|---|
| CN | 103476723 A | 12/2013 |
| CN | 104039729 A | 9/2014 |
| | (Continued) | |

OTHER PUBLICATIONS

Chinese Patent Application No. 201980038022.8, Office Action, dated May 5, 2022, 5 pages, Chinese Patent Office.
(Continued)

*Primary Examiner* — James C Yager
(74) *Attorney, Agent, or Firm* — Daniel J. Greenhalgh

(57) ABSTRACT

Locally cerammed optically transparent glass-ceramic articles for consumer products. The locally cerammed glass-ceramic articles may have one or more primary glass-ceramic regions including primary crystal phases of a glass-ceramic material and one or more secondary glass-ceramic regions including secondary crystal phases of the glass-
(Continued)

ceramic material. The primary glass-ceramic region(s) may be optically transparent and the secondary glass-ceramic region(s) may be non-optically transparent. The primary glass-ceramic region(s) may have a fracture toughness less than the fracture toughness of the secondary glass-ceramic region(s).

20 Claims, 16 Drawing Sheets

(56) References Cited

U.S. PATENT DOCUMENTS

| | | | |
|---|---|---|---|
| 5,173,453 | A | 12/1992 | Beall et al. |
| 6,928,224 | B2 | 8/2005 | Beall et al. |
| 8,839,644 | B2 | 9/2014 | Brown et al. |
| 9,110,230 | B2 | 8/2015 | Koch et al. |
| 9,272,947 | B2 | 3/2016 | Baca et al. |
| 9,328,016 | B2 | 5/2016 | Paulson |
| 9,335,444 | B2 | 5/2016 | Hart et al. |
| 9,359,261 | B2 | 6/2016 | Bellman et al. |
| 9,499,434 | B1 | 11/2016 | Sharma et al. |
| 2004/0003627 | A1 | 1/2004 | Tanigami et al. |
| 2010/0246016 | A1 | 9/2010 | Carlson et al. |
| 2011/0062849 | A1 | 3/2011 | Carlson et al. |
| 2011/0267697 | A1 | 11/2011 | Kohli et al. |
| 2011/0267698 | A1 | 11/2011 | Guilfoyle et al. |
| 2012/0231292 | A1 | 9/2012 | Chang et al. |
| 2014/0370464 | A1 | 12/2014 | Kounga et al. |
| 2015/0198752 | A1 | 7/2015 | Lander et al. |
| 2015/0329406 | A1 | 11/2015 | Kawamoto et al. |
| 2016/0102010 | A1 | 4/2016 | Beall et al. |
| 2020/0391898 | A1 | 12/2020 | Fu et al. |

FOREIGN PATENT DOCUMENTS

| | | |
|---|---|---|
| CN | 105683109 A | 6/2016 |
| CN | 107001120 A | 8/2017 |
| DE | 102016111438 A1 | 12/2017 |
| WO | 2012/143137 A1 | 10/2012 |
| WO | 2013/082477 A2 | 6/2013 |
| WO | 2013/082488 A2 | 6/2013 |
| WO | 2013/106629 A2 | 7/2013 |
| WO | 2013/106638 A1 | 7/2013 |
| WO | 2013/107653 A2 | 7/2013 |
| WO | 2015/034860 A1 | 3/2015 |

OTHER PUBLICATIONS

Cannon et al., "Analysis of Brittle Fracture of Soda Glass Bottles under Hydrostatic Pressure", Journal of Failure Analysis and Prevention, vol. 4(5), Oct. 2004, pp. 72-77.
International Search Report and Written Opinion of the International Searching Authority; PCT/US2019/026541; dated Jul. 10, 2019; 11 Pages; European Patent Office.
Mould, R. E., "The Behavior of Glass Bottles Under Impact", Journal of American Ceramic Society, 1952.
Sakamoto et al., "The study of high-speed fracture behavior of glass bottles using explosive shock waves", Computational Methods and Experimental Measurements XII, vol. 41, 2005, pp. 497-503.
Tulleners et al., "Determination of Unique Fracture Patterns in Glass and Glassy Polymers", Doc. No. 241445, Mar. 2013, 2010-DN-BX-K219, 99 pages.

LOCALLY STRENGTHENED GLASS-CERAMICS AND METHODS OF MAKING THE SAME

CROSS-REFERENCE TO RELATED APPLICATIONS

This application claims the benefit of priority under 35 U.S.C. § 371 of International Application No. PCT/US2019/026541, filed on Apr. 9, 2019, which claims the benefit of priority under 35 U.S.C. § 119 of U.S. Provisional Application No. 62/654,675, filed Apr. 9, 2018, the content of which is incorporated herein by reference in its entirety.

BACKGROUND

Field

The present disclosure relates to glass-ceramic articles. In particular, the present disclosure is related to glass-ceramic articles having first and second regions with different optical mechanical properties for providing a glass-ceramic article with suitable optical transparency and fracture toughness.

Background

Conventional materials used to manufacture transparent or translucent articles, such as for example food or beverage containers, include plastic (e.g., TRITAN™ (a kind of copolyester) and polypropylene) and stainless steel. A problem with such plastics is that it may leach harmful chemicals (e.g., endocrine disrupters like BPA) into the contents of the container. An issue with stainless steel is that it is not transparent, and some consumers report that they do not like the taste of drinks in stainless steel. Many of the glass baby feeding bottles are made from borosilicate compositions. Many of the glass personal hydration bottles on the market are soda lime glass.

Glass articles, such as glass containers are preferred in many instances because of their superior chemical properties. Food and beverages in contact with glass are typically deemed safer and taste better than those in contact with metal or plastic containers. However, glass containers can break when subjected to normal use conditions (being dropped on the ground, or subjected to thermal shocks). So there is a strong desire for glass containers to be strong enough to survive the same kinds of use conditions as metal and plastic containers.

Currently, techniques used to strengthen a glass-ceramic article include: increasing the wall thickness of the article (which means heavier weight), employing an ion-exchange process, or employing a tempering process. Each of these have disadvantages. There remains a need for lightweight strengthened glass-ceramic articles for consumer products.

BRIEF SUMMARY

The present disclosure is directed to locally strengthened glass-ceramic articles. The strength of local regions in glass-ceramic articles discussed herein may be controlled by manipulating the crystal structure of the glass-ceramic in these regions. The crystal structure may be manipulated by controlling the ceramming cycle(s) for local regions. Controlling ceramming cycle allows desired crystal structures to be produced in local regions to create desired properties. In addition to controlling the local strength of glass-ceramic articles, the optical transparency of local regions on the glass-ceramic article may be controlled by manipulating the crystal structure in local regions.

Some embodiments are directed to a glass-ceramic article including a body formed of a glass-ceramic material, the body having a primary glass-ceramic region including primary crystal phases of the glass-ceramic material and a fracture toughness of X MPa*m^½, where the primary crystal phases of the glass-ceramic material are optically transparent, and the body having a secondary glass-ceramic region including secondary crystal phases of the glass-ceramic material and a fracture toughness of Y MPa*m^½, where the secondary crystal phases of the glass-ceramic material are not optically transparent, and where Y is greater than X.

In some embodiments, the primary crystal phases of the article according to the preceding paragraph may include petalite and lithium disilicate.

In some embodiments, the secondary crystal phases of the article according to any of the preceding paragraphs may include beta-spodumene, lithium disilicate, and zirconia.

In some embodiments, the article according to any of the preceding paragraphs may include a value for X that is 0.9 MPa*m^½ or more.

In some embodiments, the article according to any of the preceding paragraphs may include a value for Y that is 2 MPa*m^½ or more.

In some embodiments, the article according to any of the preceding paragraphs may include a value for Y is at least two times more than X.

In some embodiments, the article according to any of the preceding paragraphs may include primary crystal phases of the glass-ceramic material that have a first average grain size and secondary crystal phases of the glass-ceramic material that have a second average grain size larger than the first average grain size.

In some embodiments, the article according to any of the preceding paragraphs may include a secondary glass-ceramic region having a cross-sectional area defined by the thickness of the secondary glass-ceramic region measured between an inner surface and an outer surface of the body, where a maximum thickness of an area defined by the secondary crystal phases in the cross-sectional area is equal to a maximum thickness of the cross-sectional area. In some embodiments, the article according to any of the preceding paragraphs may include a secondary glass-ceramic region having a cross-sectional area defined by the thickness of the secondary glass-ceramic region measured between an inner surface and an outer surface of the body, where a maximum thickness of an area defined by the secondary crystal phases in the cross-sectional area is less than a maximum thickness of the cross-sectional area. In some embodiments, the article according to any of the preceding paragraphs may include a secondary glass-ceramic region having a cross-sectional area defined by the thickness of the secondary glass-ceramic region measured between an inner surface and an outer surface of the body, where the cross-sectional area includes a first area defined by the primary crystal phases of the glass-ceramic material and a second area defined by the secondary crystal phases of the glass-ceramic material. In some embodiments, the second area is an central area disposed between portions of the first area.

In some embodiments, the article according to any of the preceding paragraphs may include a body that consists essentially of the primary crystal phases of the glass-ceramic material and the secondary crystal phases of the glass-ceramic material.

In some embodiments, the article according to any of the preceding paragraphs may include a body that has less than 25 wt % amorphous phase of the glass-ceramic material.

In some embodiments, the article according to any of the preceding paragraphs may include a body having a hollow interior defined by a circumferential sidewall and the secondary glass-ceramic region defines a circumferential volume of the circumferential sidewall. In some embodiments, the article may include at least two separate secondary glass-ceramic regions, with each secondary glass-ceramic region defining a circumferential volume of the circumferential sidewall. In some embodiments, with the exception of the secondary glass-ceramic regions, the circumferential sidewall may be defined by the primary glass-ceramic region. In some embodiments, the article according to any of the preceding paragraphs may include a body including a plate defined by a top surface, a bottom surface, and a perimeter edge, where the secondary glass-ceramic region defines the perimeter edge. In some embodiments, the plate may be a cover substrate for an electronic display.

Some embodiments are directed to a glass-ceramic container including a body formed of a glass-ceramic material and having a hollow interior defined by a circumferential sidewall, an open top end, and a bottom end, where the circumferential sidewall includes a primary circumferential glass-ceramic region including primary crystal phases of the glass-ceramic material and a fracture toughness of X MPa*m^½, where the primary crystal phases of glass-ceramic material are optically transparent, and the circumferential sidewall includes a secondary circumferential glass-ceramic region including secondary crystal phases of the glass-ceramic material and a fracture toughness of Y MPa*m^½, where the secondary crystal phases of the glass-ceramic material are not optically transparent, and where Y is greater than X.

In some embodiments, the glass-ceramic container according to the preceding paragraph may include at least two separate secondary circumferential glass-ceramic regions. In some embodiments, one of the secondary circumferential glass-ceramic regions defines the open top end of the body. In some embodiments, with the exception of the secondary circumferential glass-ceramic regions, the circumferential sidewall is defined by the primary circumferential glass-ceramic region.

Some embodiments are directed to a method of making a glass-ceramic article, the method including ceramming an entire glass-ceramic article including a glass-ceramic material in a first ceramming cycle at a first temperature for a first length of time, and ceramming a portion of the glass-ceramic article in a second ceramming cycle at a second temperature for a second length of time, where the first ceramming cycle forms primary optically transparent crystal phases of the glass-ceramic material having a first fracture toughness, and where the second ceramming cycle forms secondary non-optically transparent crystal phases of the glass-ceramic material having second fracture toughness greater than the first fracture toughness.

In some embodiments, the second ceramming cycle of the method according to the preceding paragraph may include comprises selectively ceramming the portion of the glass-ceramic article with a process including at least one of: laser ceramming, fire polishing, direct contact heating, and thermal shielding.

Some embodiments are directed to a glass-ceramic article made by the method of either of the two preceding paragraphs.

Some embodiments are directed to a glass-ceramic container including a body formed of a glass-ceramic material and having a hollow interior defined by a circumferential sidewall formed symmetrically around a central vertical axis, an open top end, and a bottom end, where the circumferential sidewall includes a peripheral region defined by a volume of the circumferential sidewall, the peripheral region including secondary crystal phases of the glass-ceramic material and a fracture toughness of Y MPa*m^½, where the secondary crystal phases of the glass-ceramic material are not optically transparent, and the circumferential sidewall includes a contracted region defined by a volume of the circumferential sidewall disposed closer to the central axis than the peripheral region and including primary crystal phases of the glass-ceramic material and a fracture toughness of X MPa*m^½, where the primary crystal phases of glass-ceramic material are optically transparent, and where Y is greater than X.

In some embodiments, the peripheral region of the glass-ceramic container according to the preceding paragraph may include a peripheral most region of the circumferential sidewall disposed furthest from the central vertical axis.

In some embodiments, the peripheral region of the glass-ceramic container according to either of the two preceding paragraphs may be located in a shoulder portion of the body. In some embodiments, the peripheral region may be a peripheral most region of the shoulder portion of the body. In some embodiments, the peripheral region of the glass-ceramic container according to either of the two preceding paragraphs may be located in a base portion of the body. In some embodiments, the peripheral region may be a peripheral most region of the base portion of the body. In some embodiments, the peripheral region of the glass-ceramic container according to either of the two preceding paragraphs may include the open top end of the body. In some embodiments, the peripheral region of the glass-ceramic container according to either of the two preceding paragraphs may include the bottom end of the body.

In some embodiments, the contracted region of the glass-ceramic container according to either of the three preceding paragraphs may be a smallest diameter region of the circumferential sidewall disposed closest to the central vertical axis. In some embodiments, the smallest diameter region may be located in a waist portion of the body.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
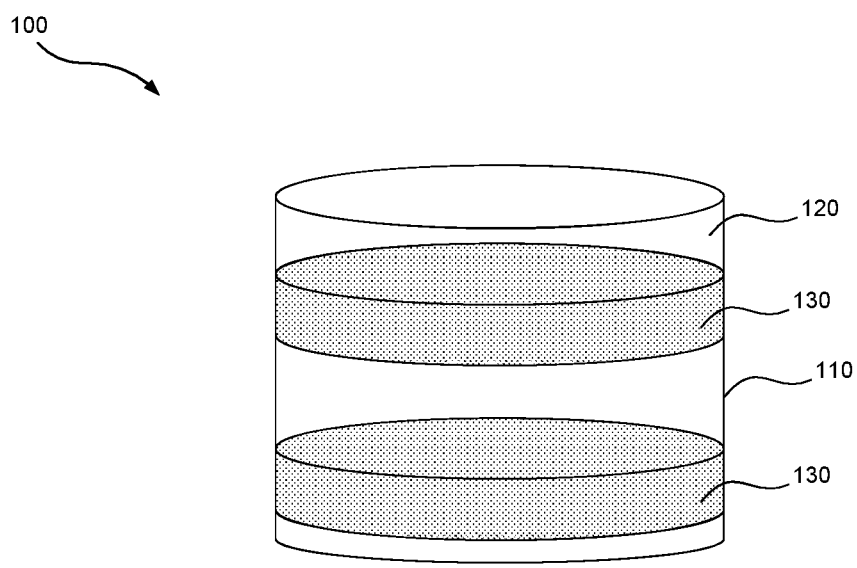
FIG. 1 illustrates a glass-ceramic article according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Glass-ceramic articles of consumer products may serve to, among other things, provide desired transparency, protect consumer products form environmental surroundings, prevent formation of mechanical defects in the glass-ceramic (e.g., scratches or cracks), and/or provide an easy to clean transparent surface. Embodiments described herein include locally strengthened glass-ceramic articles (e.g., containers) made from inorganic material and a methods of making the same. The locally strengthened articles have increased strength and fracture toughness in one or more regions for increased mechanical performance in those regions. In particular, one or more regions of the article may be locally strengthened by local ceramming of the region(s). Local ceramming may be applied to an un-cerammed glass-ceramic article or to a partially cerammed glass-ceramic article. The local ceramming may be in addition to initial ceramming (e.g., a first ceramming cycle) of the article as whole. Local ceramming, may be performed by laser ceramming, fire polishing, local shielded oven ceramming, or direct contact (conduction) heating, for example, with a hot iron.

In some embodiments, local ceramming/strengthening may be performed on only a small region of an article. In some embodiments, local ceramming/strengthening may be performed on large regions of an article. In some embodiments, local ceramming may only be performed on regions subjected to a high stress during use. For example, local ceramming may be performed on region in likely to be in direct contact with the ground during an impact event (e.g., during a drop event) or regions prone to overstressing due to thermal shock or local flexure. Through the use of local ceramming, the article may maintain the overall transparency of the glass-ceramic material from which the article is made, except for highly cerammed local regions. These highly cerammed regions may be semi-transparent, non-transparent, or opaque.

Through the use of local ceramming, other attributes that make a transparent glass-ceramic desirable for consumer product (e.g., the chemical durability and chemical inertness for food and beverage containers) are maintained. The local extra strength and fracture toughness imparted by local ceramming allow the article to have superior mechanical performance (e.g., survive more mechanical abuse, such as being dropped on a hard or sharp surface) than articles made out of standard glass materials such as soda lime or borosilicate glass. Moreover, the locally cerammed glass-ceramic articles may mechanically out perform the same transparent glass-ceramic article without local ceramming. In some embodiments, the added strength and fracture toughness provided by local ceramming may allow an article to be made thinner (e.g., made with thinner walls) while retaining the same mechanical performance as articles made from standard glass materials or glass-ceramic materials without local ceramming.

The local ceramming discussed herein retains a glass-ceramic article's optically transparent nature except in regions treated to increase the strength. Other attributes such as chemical inertness and formability of the glass-ceramic material used to make the article may also be retained. And, in some embodiments, coating layers or added components for mechanical protection can be avoided. Glass-ceramic articles discussed herein may have, relative to conventional glass articles, improved strength, which results in, for example, increased reliability in a drop event or thermal shock event, and improved resistance to crack formation, crack propagation, and chipping.

In some embodiments, local ceramming may be applied to an inside surface and/or outside surface of a glass-ceramic article. In some embodiments, local ceramming may be applied to the inside surface, the outside surface, and the entire thickness of an article between an inside surface and an outside surface (e.g., through the wall thickness of the article). In some embodiments, local ceramming may be applied to a volume of material having a thickness less than the thickness of the article (e.g., less than the wall thickness of the article). In some embodiments, local ceramming may be applied to a volume of material between an inside surface and an outside surface of an article (e.g., within the wall thickness or bulk of the article). In some embodiments, local ceramming may create stress gradients (e.g., tension-compression gradients) by ceramming regions/volumes of an article. In such embodiments, stress gradients may help improve the mechanical performance of an article. Stress gradients may be created during one or more ceramming cycles by the inherent difference in the coefficients of thermal expansion for different crystal phases of the glass-ceramic material from which a glass-ceramic article is made.

In some embodiments, local ceramming may be applied in a pattern (e.g., patterned spots and/or lines) to restrain crack propagation along an article's surface and/or through the thickness of an article (e.g., through the wall thickness of an article). The use of patterned local ceramming may serve to increase strength and/or reduce crack formation/propagation without creating entirely non-transparent or opaque regions.

In addition to providing desired mechanical properties, local ceramming may provide a desired aesthetic appearance for a glass-ceramic article. Local ceramming may be applied to produce desired aesthetic and/or functional features on an article. For example, local ceramming may produce non-transparent or opaque areas for masking or concealing certain components of a consumer product from view (e.g., certain components of an electronic display). In such embodiments, local ceramming may serve to create a non-transparent or opaque border around a display device (e.g., a border around a display screen on a mobile phone) or a window on container so a user can see the contents of the container. As another example, local ceramming may produce measurement indicia on an container. For example, local ceramming may serve to create volumetric indicators on a beverage container or measuring cup. As another example, local ceramming may produce desired patterns or designs on an article, for example, cartoon characters, pictures, and/or patterns on a baby bottle. As another example, local ceramming may produce logos on an article, for example, a manufacture's logo. Since local ceramming optically changes the glass-ceramic material itself by altering the material's crystal structure, such aesthetic and/or functional features cannot be washed or worn away overtime. Also, such aesthetic and/or functional features cannot be intentionally removed without significant damage to the article.

Glass-ceramic articles disclosed herein may be incorporated into another article, such as an article with a display (or display articles) (e.g., consumer electronic products, including mobile phones, tablets, computers, navigation systems, wearable devices (e.g., watches) and the like), architectural articles, transportation articles (e.g., automotive, trains, aircraft, sea craft, etc.), appliance articles, or any article that may benefit from some transparency, scratch-resistance, abrasion resistance, or a combination thereof.

In some embodiments, glass-ceramic articles discussed herein may be containers used in the food and beverage industry or the medical and pharmaceutical industry. These containers serve to, among other things, allow the contents of the container to be easily viewed by a user and to protect the contents from contamination. These containers are also typically subjected to severe mechanical stress, such as for example, thermal shock or thermal cycling during use and/or cleaning of the container and impact stresses when the containers are dropped. Transparent containers having superior mechanical properties that resist failure (e.g., fracturing) during severe mechanical stress result are more durable. In some instances the weight of such containers is also a factor. These containers may be transported frequently, for example, during travel or during lab experiments. Accordingly, a lightweight transparent container that exhibits superior mechanical properties may be desirable.

Containers according to the present disclosure may be, but are not limited to, baby bottles, personal hydration bottles, pharmaceutical vials, laboratory vessels, and the like. The containers improve upon plastic containers by replacing the plastic with an inert, safe material that does not leach harmful chemicals, such as endocrine disruptors, into the contents of the container. They also improve the environmental impact by replacing plastic containers, which may not biodegrade, with a reusable glass-ceramic material. The containers also improve upon glass containers (which are themselves an improvement on plastic containers as noted above) by offering improved mechanical performance. The improved mechanical performance of the containers improves their resistance to failure (e.g., fracture) and facilitates the manufacture of thinner and lighter containers that perform as well as their glass counterparts.

In some embodiments, the improvement discussed herein can be achieved without the use of one or more of the following methods of strengthening a glass-ceramic material: an ion-exchange process, a tempering processes, or lamination process. In some embodiments, these improvements can be achieved without the use of any of these three strengthening methods. Eliminating the need for one or more of these methods can decrease manufacturing costs and eliminate the disadvantages associated with these methods.

An ion-exchange process implants larger ions in the surface of an article, producing compressive stress. The difficulty with using this strengthening method is that it works best when all parts of the article are of uniform thickness. A container made by, for example, press and blow molding may not have good thickness uniformity. As such, ion exchange may produce containers with some regions of high central tension and some with low central tension. This would tend to produce local areas more prone to failure. Ion exchange can also produce very high central tension that can provide the driving force for delayed failure (a crack that grows until it is deep enough to liberate the central tension). If an article is intended to be used multiple times in rugged environments, the possibility of delayed failure is a problem.

Tempering is the process of heating an article and then quenching the surface, which produces a compressive stress at the surface and central tension in the middle of the glass wall. The issues with using it for containers include: a) it typically only works well on thick walls (3 mm or greater), which makes the container quite heavy, b) it can be challenging to extract heat from the inner surface of the container, due to convection currents that are needed to evacuate the hot air from the inside of the container, and c) it can place some design limitations on the container.

Lamination is the process of making an article's walls out of multiple layers, e.g., multiple layers of different glasses. For example, a laminated glass material may include a low coefficient of thermal expansion (CTE) glass for one or more clad layers and a high CTE glass for the core layer. The challenge with such an approach is achieving uniform thickness of the layers all around an article, such as a container with a closed bottom, without exposing the central tension in the core.

A multi-layer glass tube can be tailored with attributes required for an intended use. For example, on a three layer cylindrical object (e.g., a tube) one can tailor an outer clad layer for abrasion and impact damage while the inner compositional layer can be tailored to increase durability. Clad layers can be the same or different glasses. The middle core layer can be a glass composition that has a CTE matched or mismatched to the clad glasses for greater strength. The greater the CTE mismatch is, the greater the stress, central tension, and strength will be. However, an exposed middle core would generate surface tensile stress if there's a high mismatch of CTE. In some cases, having an exposed core may result in failure of an article if the article is subjected to an impact.

During a forming process, provisions can be made to have a uniform laminate structure. For example, in a container, uniform wall thickness can be maintained through the wall and bottom of the container depending on the forming process used. Two big areas of concern are the center of the bottom as the circular glass comes together and the mouth or lip of the container. Those two areas are susceptible to the formation of an exposed core during formation. Any edge of such a laminated glass has a core layer open. An exposed core at an edge with high stress levels can create a failure unless a formation process or post-formation process is used to cover the exposed core. A forming process that eliminates the need for multi-layer glass formation to achieve desired strength properties eliminates the chance of an exposed core that can cause failure of an article.

In some embodiments, glass-ceramic containers described herein may include walls with a consistent and highly controlled thickness and with no central tension, and the processes employed to produce the container may not create any kind of central tension. Removing central tension reduces that chance of delayed or spontaneous failure. Further, a consistent wall thickness reduces the likelihood of mechanical failure associated with regions of high central tension and some with low central tension created by unintended changes in thickness. Containers according to the present disclosure make it more difficult for a crack to propagate in the container, which leads to better mechanical performance and/or the ability to make the walls thinner.

In some embodiments, a container is made from a glass-ceramic material exhibiting the following qualities: (a) a chemically inert material generally regarded as safe for food and beverage contact, (b) a higher fracture toughness than other glass materials, but is otherwise indistinguishable from glass—it is transparent, inert, and formable with the same glass-making methods, and (c) produces a container which has better mechanical performance and/or thinner walls than containers made from standard glass materials (e.g., soda lime and borosilicate). In some embodiments, the glass-ceramic material may meet Class 3 hydrolytic stability for European Pharmacopoeia 8.4 Hydrolytic Resistance Test.

FIG. 1 illustrates a glass-ceramic article 100 according to some embodiments. Glass-ceramic article includes a body 110 formed of a glass-ceramic material as discussed herein. Body 110 of article 100 includes different regions for providing desired and different characteristics to different regions of body 110. The different characteristics for different regions of body are controlled by manipulating the crystal structure of the glass-ceramic body 110. This crystal structure manipulation may be obtained by controlling the ceramming cycle(s) of the glass-ceramic material in different regions of body 110.

Body 110 includes one or more primary glass-ceramic regions 120 including primary crystal phases of the glass-ceramic material from which body 110 is formed. The primary crystal phases of the glass-ceramic material from which body 110 is formed are optically transparent. In some embodiments, primary crystal phases may include petalite and lithium disilicate.

Body 110 also includes one or more secondary glass-ceramic regions 130 including secondary crystal phases of the glass-ceramic material from which body 110 is formed. The secondary crystal phases of the glass-ceramic material from which body 110 is formed are not optically transparent (e.g., opaque). In some embodiments, the secondary crystal phases may include beta-spodumene, lithium disilicate, and zirconia. As used herein the terms, "primary" and "secondary" do not infer compositional percentages of an article or body. For example, "primary" does not mean that an article or body is composed of more than 50% of certain crystal phases. Rather, "primary" crystal phases are crystal phases of a glass-ceramic material that form prior to "secondary" crystal phases during one or more ceramming cycles.

As used herein, "optically transparent" means an average transmittance of 70% or more in the wavelength range of 400 nm to 700 nm through a 1.0 mm thick piece of a material. In some embodiments, an optically transparent material may have an average transmittance of 75% or more, 80% or more, 85% or more, or 90% or more in the wavelength range of 400 nm to 700 nm through a 1.0 mm thick piece of the material. The average transmittance in the wavelength range of 400 nm to 700 nm is calculated by measuring the transmittance of all wavelengths between 400 nm and 700 nm, and averaging the measurements. In some embodiments, optical transparency of a glass-ceramic can be achieved by producing crystals smaller than the wavelength of the interrogating wavelength of light and by matching the index of refraction of residual glass within the glass-ceramic with that of the primary crystal phases (petalite (1.51) and lithium disilicate (1.55)).

In some embodiments, a glass-ceramic may be translucent over the wavelength range of 400 nm to 700 nm through a 1.0 mm thick piece of a material. In some embodiments, a translucent glass-ceramic can have an average transmittance in a range from about 20% to less than about 75% of light over the wavelength range of about 400 nm to about 700 nm for a glass-ceramic article having a thickness of 1 mm. "Opaque" means no light within the wavelength range of 400 nm to 700 nm is able to transmit through a 1.0 mm thick piece of a material. In embodiments where the glass-ceramic is translucent or opaque, the glass-ceramic may have a white color.

In some embodiments, the size of the grains in a glass-ceramic may affect the transparency, translucency, or opacity. In some embodiments, the grains of optically transparent glass-ceramics may have a longest dimension of less than about 100 nm. In some embodiments, the grains of translucent or opaque glass-ceramics may have a longest dimension in a range from about 100 nm to about 500 nm. In some embodiments, the grains of transparent glass-ceramics may have an aspect ratio of about 2 or greater. In some embodiments, the grains of translucent or opaque glass-ceramics may have an aspect ratio of about 2 or less.

In some embodiments, body 110 may consist essentially of the primary crystal phases of the glass-ceramic material and the secondary crystal phases of the glass-ceramic material. In some embodiments, body 110 may include less than 25 wt % (weight percent) amorphous phase of the glass-ceramic material. As used herein, "amorphous phase" of a glass-ceramic body/article references the "residual glass" phase left over after ceramming, i.e., the wt % of the body/article that is un-cerammed and is therefore defined by an unordered crystal structure. In some embodiments, body 110 may include less than 20 wt %, 15 wt %, or 10 wt % amorphous phase of the glass-ceramic material. The wt % of amorphous phase is a glass-ceramic article may be measured by X-ray diffraction.

A primary glass-ceramic region 120 is defined by a region having a continuous volume of crystal phases that are composed entirely or almost entirely of primary crystal phases of a glass-ceramic material, for example at least 90 vol %, 95 vol %, or 98 vol % primary crystal phases. A secondary glass-ceramic region 130 is defined by a region having a continuous volume of crystal phases that include a significant amount of secondary crystal phases of a glass-ceramic material, for example at least 25 vol %, 33 vol %, 50 vol %, 67 vol %, or 75 vol % secondary crystal phases. Both primary and secondary glass-ceramic regions may include residual glass as discussed herein. Such residual glass is factored out when determining volume percentages of primary and secondary crystal phases in a region 120 or 130. A secondary glass-ceramic region 130 may include both primary and secondary crystal phases of a glass-ceramic material as long as the secondary crystal phases define a significant portion of the region's continuous volume. For example, a secondary glass-ceramic region 130 may be a patterned region including both primary and secondary crystal phases. A secondary glass-ceramic region 130 does not overlap with or include a primary glass-ceramic region 120.

In addition to providing different optical transparency to different regions of body 110, primary and secondary glass-ceramic regions 120/130 provide different mechanical properties to different regions of body 110. Primary glass-ceramic region(s) 120 may have a fracture toughness of X MPa*m^½ (MPa=megapascals). And secondary glass-ceramic region(s) 130 may have a fracture toughness of Y MPa*m^½ that is greater than X. In some embodiments, Y may be at least 1.5 times more than X. In some embodiments, Y may be at least 2 times more than X. In some embodiments, Y may be at least 2.5 times more than X. Unless specified otherwise, the fracture toughness of a material is measured by ASTM E1304-97 "Standard Test Methods for Plane-Strain (Chevron-Notch) Fracture Toughness of Metallic Materials."

In some embodiments, primary glass-ceramic region(s) 120 may have a fracture toughness of 0.9 MPa*m^½ or more. In some embodiments, primary glass-ceramic region(s) 120 may have a fracture toughness of 0.5 MPa*m^½ or more, 0.6 MPa*m^½ or more, 0.7 MPa*m^½ or more, 0.75 MPa*m^½ or more, 0.8 MPa*m^½ or more, 0.9 MPa*m^½ or more, 1 MPa*m^½ or more, 1.1 MPa*m^½ or more, 1.2 MPa*m^½ or more, 1.25 MPa*m^½ or more, 1.3 MPa*m^½ or more, 1.4 MPa*m^½ or more, or 1.5 MPa*m^½ or more. In some embodiments, primary glass-ceramic region(s) 120 may have a fracture toughness in the range of 0.5 MPa*m^½ to 1.5 MPa*m^½ including subranges. For example, primary glass-ceramic region(s) 120 may have a fracture toughness of 0.5, 0.6, 0.7, 0.75, 0.8, 0.9, 1, 1.1, 1.2, 1.25, 1.3, 1.4, or 1.5 MPa*m^½, or within any range having any two of these values as endpoints.

In some embodiments, secondary glass-ceramic region(s) 130 may have a fracture toughness of 2 MPa*m^½ or more. In some embodiments, secondary glass-ceramic region(s) 130 may have a fracture toughness of 1.5 MPa*m^½ or more, 1.6 MPa*m^½ or more, 1.7 MPa*m^½ or more, 1.75 MPa*m^½ or more, 1.8 MPa*m^½ or more, 1.9 MPa*m^½ or more, 2 MPa*m^½ or more, 2.1 MPa*m^½ or more, 2.2 MPa*m^½ or more, 2.25 MPa*m^½ or more, 2.3 MPa*m^½ or more, 2.4 MPa*m^½ or more, or 2.5 MPa*m^½ or more. In some embodiments, secondary glass-ceramic region(s) 130 may have a fracture toughness in the range of 1.5 MPa*m^½ to 2.5 MPa*m^½ including subranges. For example, secondary glass-ceramic region(s) 130 may have a fracture toughness of 1.5, 1.6, 1.7, 1.75, 1.8, 1.9, 2, 2.1, 2.2, 2.3, 2.4, or 2.5 MPa*m^½, or within any range having any two of these values as endpoints.

In some embodiments, the average grain size of the primary crystal phases of the glass-ceramic material may be different from the average grain size of the secondary crystal phases of the glass-ceramic material. In some embodiments, the primary crystal phases of the glass-ceramic material may have an average grain size and the secondary crystal phases of the glass-ceramic material may have an average grain size larger than the average grain size of the primary crystal phases. In some embodiments, the average grain size of the primary crystal phases may be within the range of 10 nanometers to 100 nanometers. In some embodiments, the average grain size of the secondary crystal phases may be within the range of 100 nanometers to 1000 nanometers. In general, a larger average grain size will result in a glass-ceramic material with a higher fracture toughness. Unless indicated otherwise, average grain size may be determined by observing the microstructure of a glass-ceramic under a scanning electron microscope (SEM) and utilizing ASTM E112 "Standard Test Methods for Determining Average Grain Size." In some embodiments, the different average grain sizes of the primary and secondary crystal phases may produce desired stress profiles for a glass-ceramic article.

In some embodiments, the coefficient of thermal expansion of the primary crystal phases of the glass-ceramic material may be different from the coefficient of thermal expansion of the secondary crystal phases of the glass-ceramic material. In some embodiments, the primary crystal phases of the glass-ceramic material may have a coefficient of thermal expansion that is smaller than the coefficient of thermal expansion of the secondary crystal phases of the glass-ceramic material. In some embodiments, the coefficient of thermal expansion of the primary crystal phases may be within the range of $10 \times 10^{-7}/°$ C. (degrees C.) to $100 \times 10^{-7}/°$ C. In some embodiments, the coefficient of thermal expansion of the secondary crystal phases may be within the range of $10 \times 10^{-7}/°$ C. to $100 \times 10^{-7}/°$ C.

In some embodiments, article 100 may include at least two separate primary glass-ceramic regions 120. In some embodiments, article 100 may include at least two separate secondary glass-ceramic regions 130. In some embodiments, with the exception of secondary glass-ceramic region(s) 130, article 100 may be defined by primary glass-ceramic region(s) 120. Article 100 may include any number of separate primary glass-ceramic regions 120 and secondary glass-ceramic regions 130.

Figure 7A:
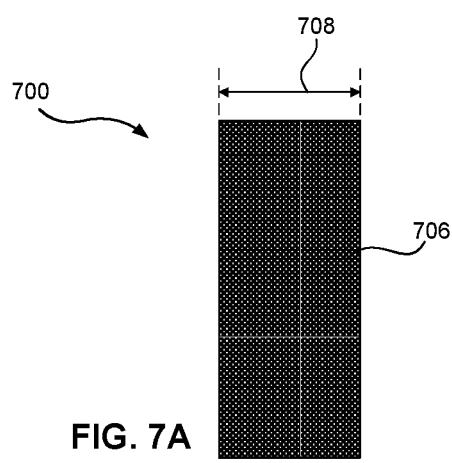
FIGS. 7A-7D illustrate cross-sections of a glass-ceramic article according to various embodiments.
Figure 7B:
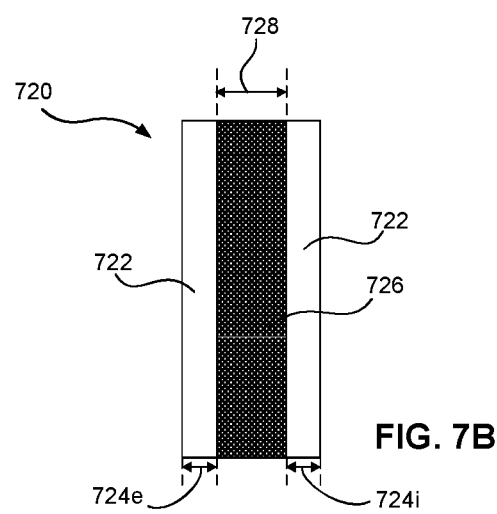
Figure 7C:
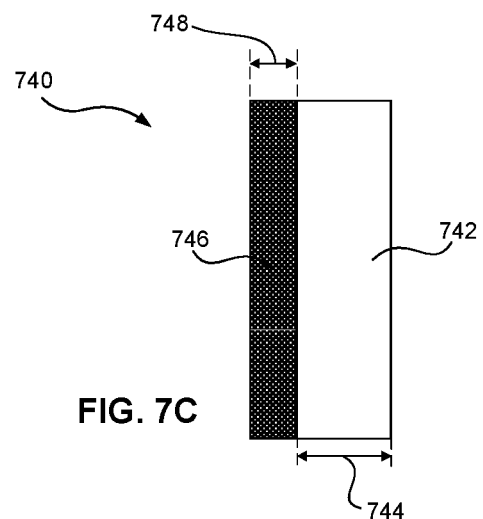
Figure 7D:
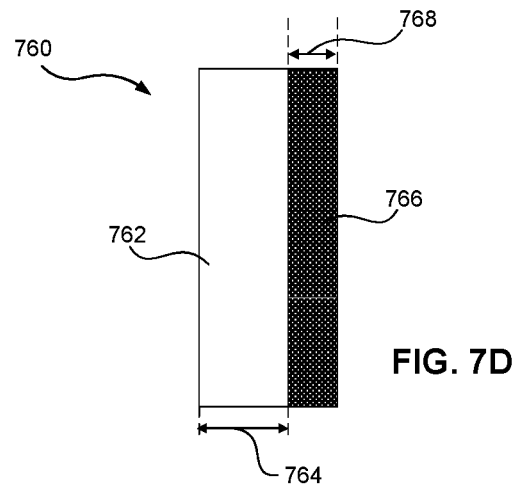
Figure 8A:
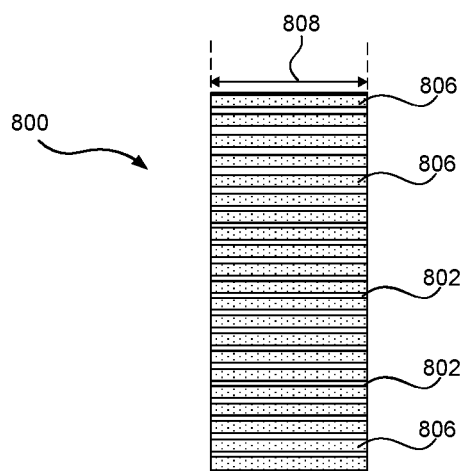
FIGS. 8A-8D illustrate cross-sections of a glass-ceramic article according to various embodiments.
Figure 8B:
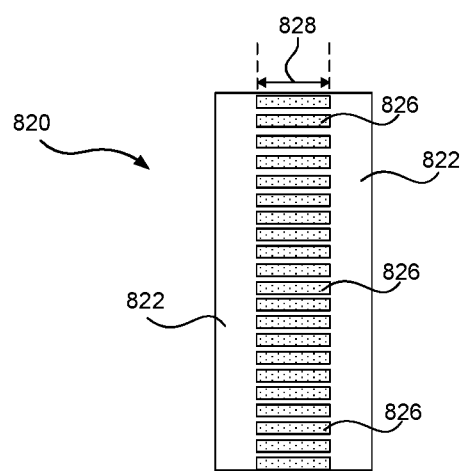
Figure 8C:
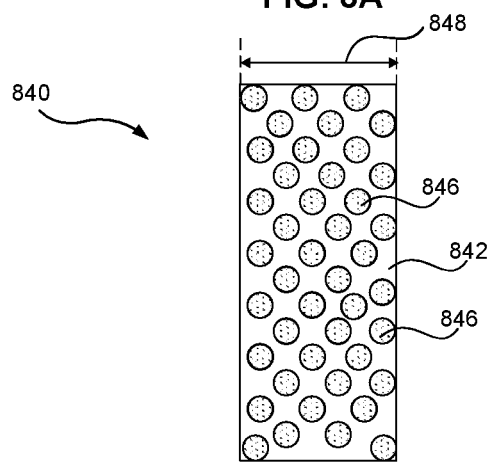
Figure 8D:
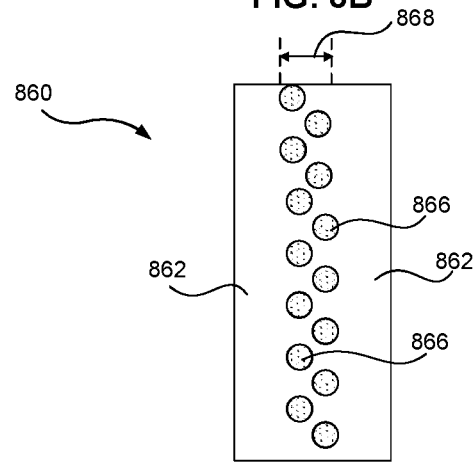

Primary glass-ceramic regions 120 and/or secondary glass-ceramic regions 130 may be formed by ceramming article 100 for appropriate times at appropriate temperatures. Ceramming regions 120/130 may include one or more of the following processes: convention heating in an oven, laser ceramming, fire polishing, direct contact (conduction) heating, or local shielded oven ceramming. In some embodiments, a UV laser producing 2 watt average power at 100 mm/s may be utilized in a laser ceramming process to locally ceram regions of glass-ceramic article 100. In some embodiments, laser ceramming may be used to form secondary glass-ceramic regions 130 within the bulk of glass-ceramic article 100 (e.g., within a sidewall as illustrated in FIGS. 7B, 8B, and 8D).

Figure 2:
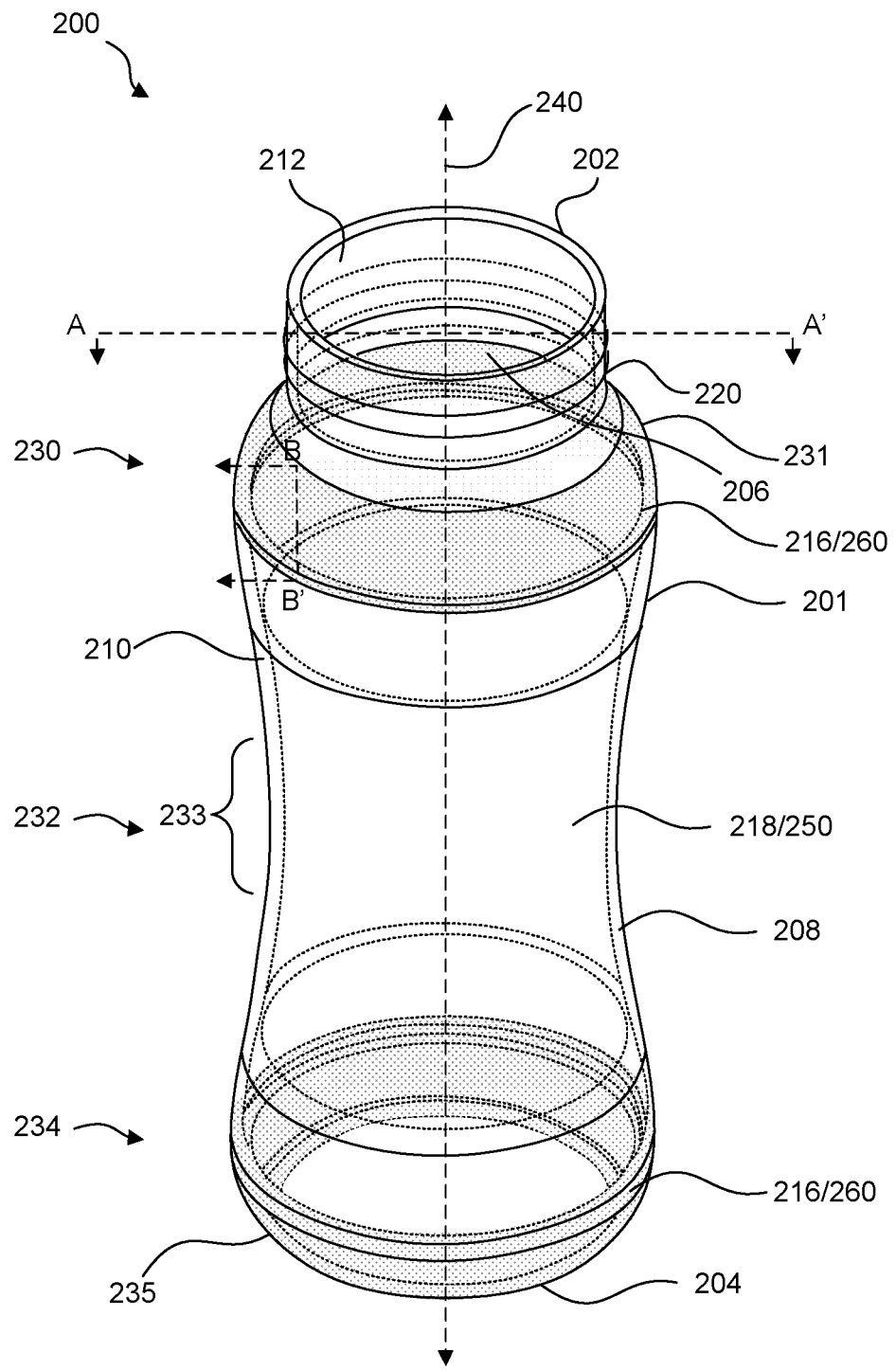
FIG. 2 illustrates a container according to some embodiments.

FIG. 2 illustrates a glass-ceramic container 200 according to some embodiments. Glass-ceramic container 200 includes a body 201 having a top end 202, a bottom end 204, and a circumferential sidewall 208. Top end 202 and/or bottom end 204 may be an open end that may be removably covered and/or sealed with, for example, a cap or lid. In some embodiments, top end 202 or bottom end 204 may be a closed end. Together, top end 202, bottom end 204, and circumferential sidewall 208 define a hollow interior 206 of body 201. In operation, hollow interior 206 houses the contents (e.g., fluid(s)) of container 200. As used herein, the term "circumferential" applies not only to circular or cylindrical transverse cross-sectional shapes but also to any transverse cross-sectional shape.

In some embodiments, hollow interior 206 may have an interior volume of about 280 milliliters (mL). In some embodiments, hollow interior 206 may have an interior volume in the range of 250 mL to 350 mL. In some embodiments, hollow interior 206 may have an interior volume in the range of 400 mL to 1000 mL. In some embodiments, body 201 may have a weight of 150 grams or less per 280 mL of internal volume of hollow interior 206. In some embodiments, for a body 201 having an interior volume of 280 mL+/−30%, body 201 may have a weight of 150 grams or less.

Also as shown in FIG. 2, container 200 includes a spout and neck portion 230, a middle portion 232, and a base portion 234. Base portion 234 is adjacent to and includes bottom end 204 of body 201. Base portion 234 also includes a foot 235 of container 200. Spout and neck portion 230 includes top end 202 of body 201. In some embodiments, spout and neck portion 230 may include a shoulder portion 231 of container 200. Middle portion 232 is disposed between base portion 234 and spout and neck portion 230. In some embodiments, middle portion 232 may include a waist portion 233 having a diameter smaller than other portions of container 200. Portions 230, 232, and 234 are not intended to demarcate precise areas of container 200. Rather, portions 230, 232, and 234 are intended to represent general areas of container 200 that provide a frame of reference. In some embodiments, spout and neck portion 230 may include threads 220 for coupling with a cap or lid to cover and/or seal top end 202 of body 201. In such embodiments, threads 220 may be located on a spout portion of the spout and neck portion 230. In some embodiments, portion 230 may not include a neck portion and therefore may be called a spout portion, or an open end portion.

Circumferential sidewall 208 has an exterior surface 210, an interior surface 212, and a wall thickness 214 measured between exterior surface 210 and interior surface 212. In some embodiments, exterior surface 210 may define all, or at least a portion of, an outermost surface of glass-ceramic container 200 (i.e., the surface of container 200 in contact with the atmosphere). In some embodiments, interior surface 212 may define all, or at least a portion of, an innermost surface of glass-ceramic container 200 (i.e., the surface of container 200 in contact with the contents of container 200).

In some embodiments, glass-ceramic container 200 and/or body 201 may have radial symmetry about a central vertical axis 240 extending from top end 202 of body 201 to bottom end 204 of body 201. Central vertical axis 240 may be the imaginary line running through the center of gravity of body 201 between top end 202 and bottom end 204.

Hollow interior 206 has height measured from top end 202 to bottom end 204 of body 201 and an average diameter defined by an inner diameter of circumferential sidewall 208 along the height of body 201. In some embodiments, the height of body 201 may be larger than the average diameter of body 201. In some embodiments, the height of body 201 may be smaller than the average diameter of body 201. In some embodiments, the height of body 201 may be about the same as the average diameter of body 201.

Figure 3:
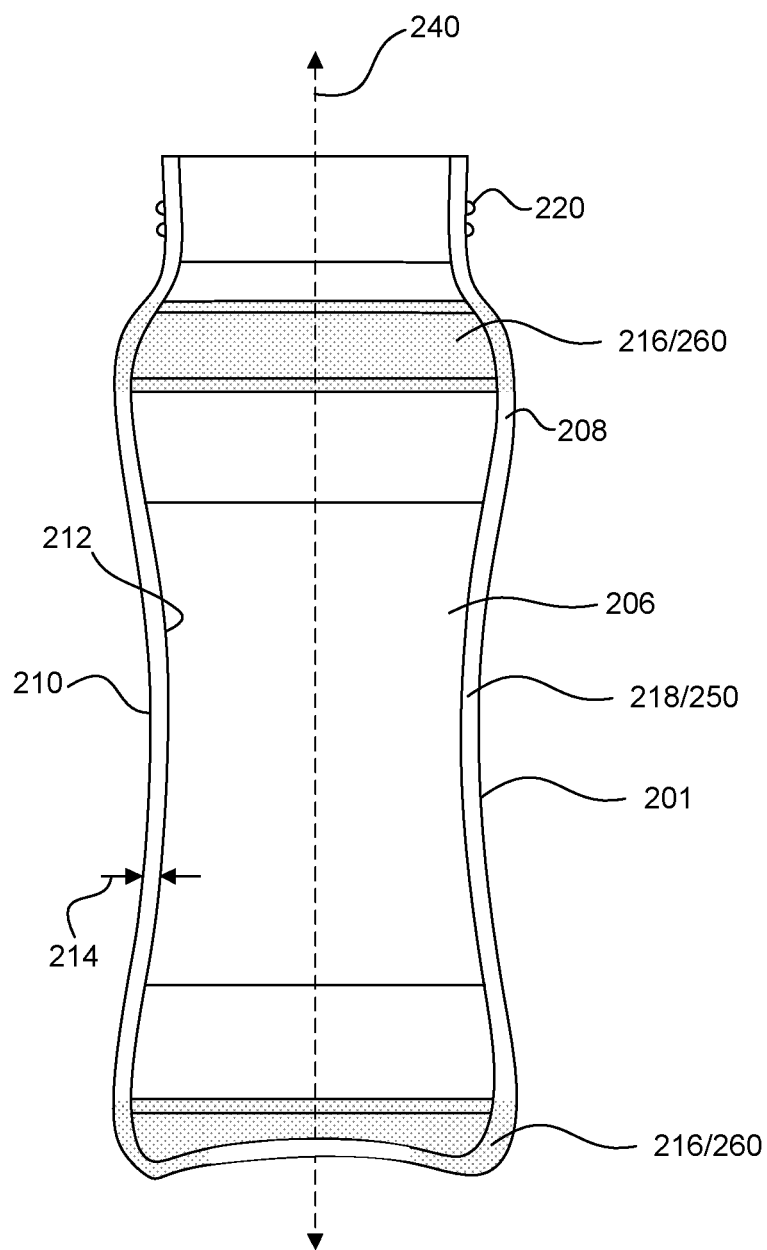
FIG. 3 illustrates a cross-sectional view of a container taken along the line A-A' in FIG. 2 according to some embodiments.

In some embodiments, body 201 may have a uniform wall thickness 214. FIG. 3 shows body 201 having a uniform wall thickness 214 according to some embodiments. In embodiments having a uniform wall thickness 214, the difference between the maximum thickness and the minimum thickness of circumferential sidewall 208 may be 0.20 mm or less, 0.15 mm or less, 0.10 mm or less, or 0.05 mm or less.

A container having uniform wall thickness may be increase the ease and reproducibility of manufacturing a container having desired mechanical and optical characteristics. A uniform wall thickness may reduce the likelihood of mechanical or optical defects due to a change in wall thickness of circumferential sidewall 208. For example, a change in wall thickness, whether intentional or non-intentional, may be associated with stress concentrations that facilitate the formation and growth of cracks. As another example, a change in wall thickness, whether intentional or non-intentional, may result in undesirable optical properties, such as optical distortion or aesthetically unappealing features.

In some embodiments, body 201 may have a non-uniform wall thickness 214. In such embodiments, the wall thickness 214 of body may be tailored to reduce the weight of container 200 while maintaining container strength. In some embodiments, wall thickness 214 in areas/regions of circumferential sidewall 208 subject to the highest level of stress when container is dropped (e.g., stresses imparted by the impact force of container 200 contacting a surface) may have localized increased thickness relative to other areas/regions of circumferential sidewall 208.

In some embodiments, the average wall thickness of middle portion 232 may be less than the average wall thickness of base portion 234 and/or spout and neck portion 230. In some embodiments, the average wall thickness of middle portion 232 may be in the range of 2 mm to 1.2 mm. In some embodiments, the average wall thickness of middle portion 232 may be in the range of 1.8 mm to 1.2 mm. In some embodiments, the average wall thickness of middle portion 232 may be in the range of 1.6 mm to 1.2 mm. In some embodiments, the average wall thickness of middle portion 232 may be in the range of 1.4 mm to 1.2 mm. In some embodiments, the average wall thickness of base portion 234 and/or spout and neck portion 230 may be in the range of 3 mm to 1.5 mm. In some embodiments, the average wall thickness of base portion 234 and/or spout and neck portion 230 may be in the range of 2.5 mm to 1.5 mm. In some embodiments, the average wall thickness of base portion 234 and/or spout and neck portion 230 may be in the range of 2.1 mm to 1.5 mm. In some embodiments, a container having an internal volume in the range of 250 mL to 350 mL (e.g., a 280 mL baby bottle) may have a sidewall with such average thicknesses.

Figure 4:
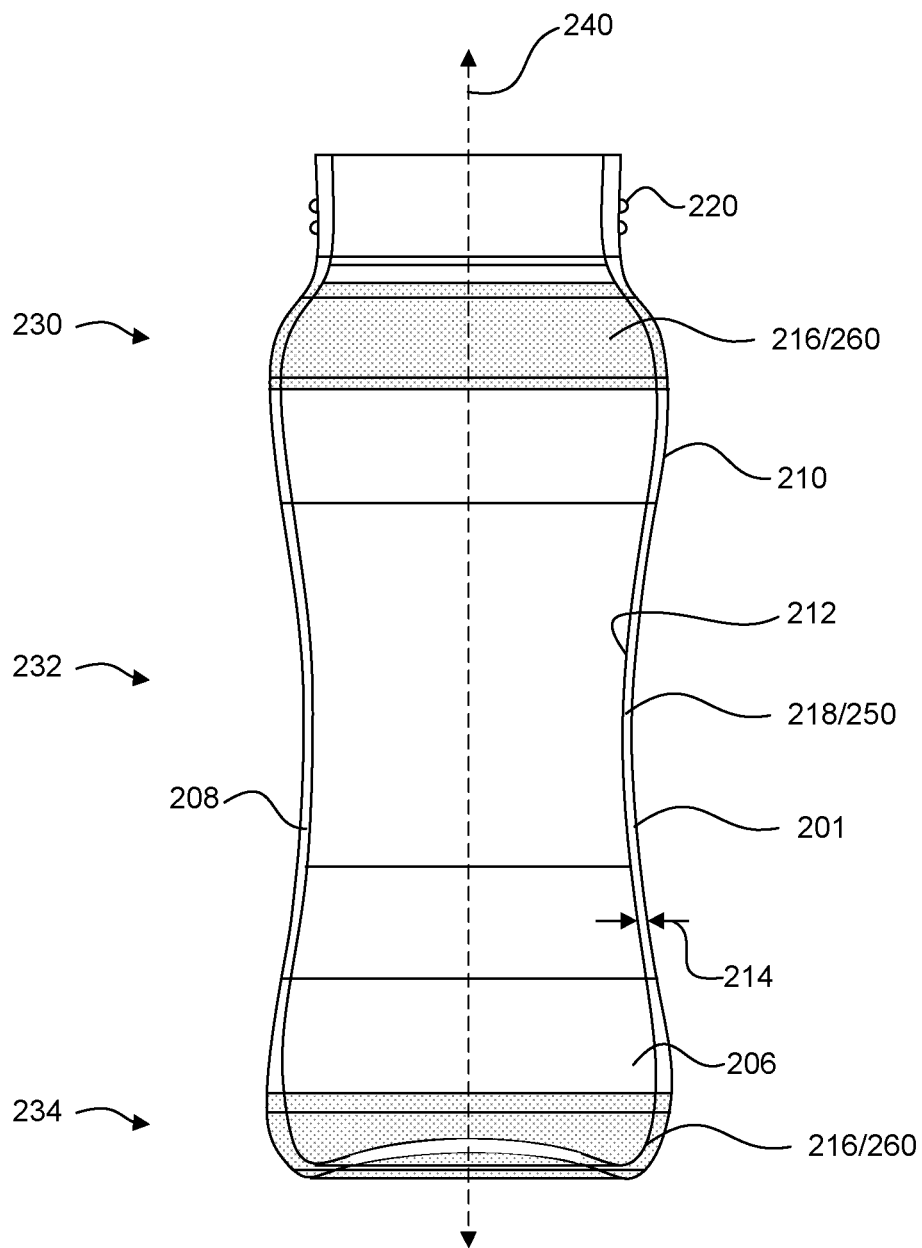
FIG. 4 illustrates a cross-sectional view of a container taken along the line A-A' in FIG. 2 according to some embodiments.

In some embodiments, the average wall thickness of middle portion 232 may be more than the average wall thickness of base portion 234 and/or spout and neck portion 230. In some embodiments, the average wall thickness of base portion 234 and/or spout and neck portion 230 may be in the range of 2 mm to 1.2 mm. In some embodiments, the average wall thickness of base portion 234 and/or spout and neck portion 230 may be in the range of 1.8 mm to 1.2 mm. In some embodiments, the average wall thickness of base portion 234 and/or spout and neck portion 230 may be in the range of 1.6 mm to 1.2 mm. In some embodiments, the average wall thickness of base portion 234 and/or spout and neck portion 230 may be in the range of 1.4 mm to 1.2 mm. In some embodiments, the average wall thickness of middle portion 232 may be in the range of 3 mm to 1.5 mm. In some embodiments, the average wall thickness of middle portion 232 may be in the range of 2.5 mm to 1.5 mm. In some embodiments, the average wall thickness of middle portion 232 may be in the range of 2.1 mm to 1.5 mm. In some embodiments, a container having an internal volume in the range of 200 mL to 350 mL (e.g., a 280 mL baby bottle) may have a sidewall with such average thicknesses. FIG. 4 shows body 201 having a non-uniform wall thickness 214 according to some embodiments.

As shown for example in FIGS. 2-4, circumferential sidewall 208 of body 201 may include one or more primary circumferential glass-ceramic regions 250 and one or more secondary circumferential glass-ceramic regions 260. Primary and secondary circumferential glass-ceramic region(s) 250 and 260 have crystal phases and characteristics as described herein for primary and secondary glass-ceramic region(s) 120 and 130. A primary circumferential glass-ceramic region 250 is defined by a region having a continuous circumferential volume composed of crystal phases that are entirely or almost entirely of primary crystal phases of a glass-ceramic material. A circumferential secondary glass-ceramic region 260 is defined region having a continuous circumferential volume composed crystal phases including a significant amount of secondary crystal phases of a glass-ceramic material. A volume of a particular circumferential region of circumferential sidewall 208 may be measured by taking the integral of the cross-sectional area of circumferential sidewall 208 within the region bound by an upper height and a lower height.

Circumferential volumes are volumes disposed radially around a central axis of a container (e.g., central axis 250). In some embodiments, a circumferential volume may be a volume disposed all the way around a central axis (e.g., a volume extending 360° around a central axis). In some embodiments, a circumferential volume may be disposed partially around a central axis, for example 45°, 90°, 135°, 180°, 225°, 270°, or 315° around a central axis. Unless indicated otherwise, a circumferential volume may be a continuous volume that extends around a central axis by at least 45°, radially. In some embodiments, a circumferential volume may have a thickness dimension defined by the thickness of the circumferential sidewall from which it is taken. In some embodiments, a circumferential volume may have a thickness dimension defined by a thickness less than the thickness of the circumferential sidewall from which it is taken. For example, a circumferential volume may be defined by an outer circumferential portion (e.g., an outer circumferential half) of a circumferential sidewall or by an inner portion (e.g., an inner circumferential half) of a circumferential sidewall.

In some embodiments, a primary glass-ceramic region 250 may be a contracted region 218 of circumferential sidewall 208. A contracted region 218 of circumferential sidewall 208 will be defined by a volume of circumferential sidewall 208 disposed closer to central vertical axis 240 of container 200 than the volume of at least one peripheral region 216 of circumferential sidewall 208. In some embodiments, a contracted region 218 may be region disposed between larger diameter portions of circumferential sidewall 208. A contracted region 218 of circumferential sidewall 208 may be a volume of sidewall 208 defining the smallest diameter portion or portions of body 201 disposed closest to central vertical axis 240 of container 200. For example, in some embodiments, the smallest diameter portion of body 201 any be located in waist portion 233 of body 201. The location of contracted portion(s) 218 will depend on the shape of body 201.

In some embodiments, a secondary glass-ceramic region 260 may be a peripheral region 216 of circumferential sidewall 208. A peripheral region 216 of circumferential sidewall 208 may be a volume of sidewall 208 defining the largest diameter portion or portions of body 201, for example shoulder portion 231 of body 201 or foot 235 of body 201.

In some embodiments, a peripheral region 216 of circumferential sidewall 208 may include a peripheral most region of circumferential sidewall 208 disposed furthest from central vertical axis 240 of body 201. In some embodiments, a peripheral region 216 may be located in shoulder portion 231 of body 201. In some embodiments, a peripheral region may be a peripheral most region of shoulder portion 231 of body 201. In some embodiments, a peripheral region 216 may be located in base portion 234 of body 201. In some embodiments, a peripheral region 216 may be a peripheral most region of base portion 234 of container 200. In some embodiments, a peripheral region 216 may include top end 202 of container 200. In such embodiments, peripheral region 216 may define the portion of circumferential sidewall 208 defining an open top end 202 of container 200. In some embodiments, a peripheral region 216 may include bottom end 204 of container 200.

Figure 11:
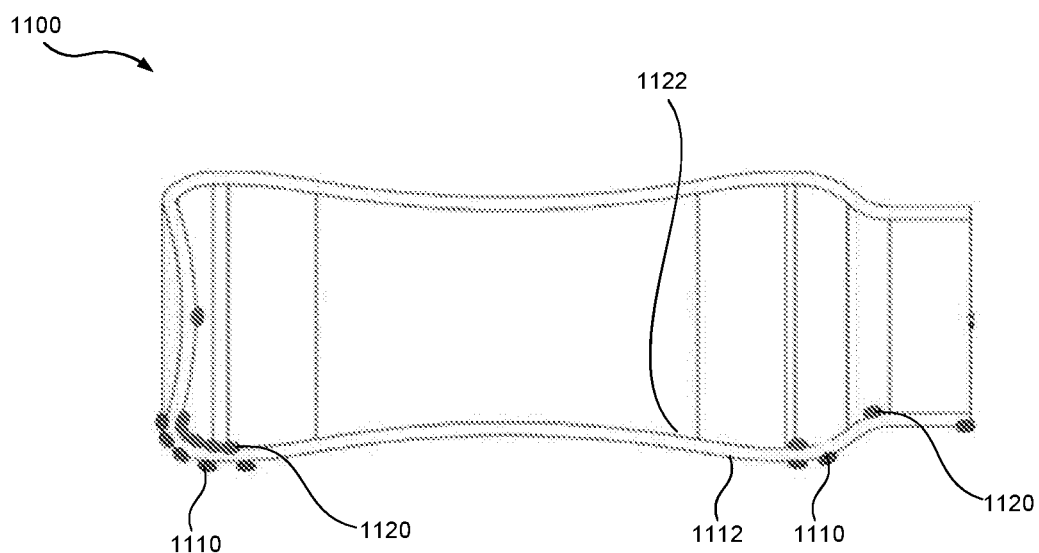
FIG. 11 illustrates areas of high stress for a glass-ceramic container according to some embodiments.

As illustrated and explained in reference to FIG. 11, peripheral region(s) of a body/container may be subject to the largest amounts of mechanical stress during use. As such, tailoring these regions to include secondary crystal phases as discussed herein may improve the mechanical performance of a body/container. In other words, having peripheral region(s) of a body/container including, in whole or in part, secondary glass-ceramic regions as discussed herein may improve the mechanical performance of a body/container.

In some embodiments, body 201 may include at least two separate circumferential secondary glass-ceramic regions 260. In some embodiments, with the exception of the circumferential secondary glass-ceramic region(s) 260, circumferential sidewall 208 may be defined by primary circumferential glass-ceramic regions 250. In some embodiments, a secondary circumferential glass-ceramic region 260 may define an open top end 202 of body 201. The number, volume, and location of primary glass-ceramic regions 250 and secondary glass-ceramic regions 260 may be tailored based on a stress analysis for a particular container (e.g., the stress analysis discussed with regard to FIG. 11). Also, in some embodiments, the thickness 214 of circumferential sidewall 208 may influence the number, volume, and location of primary glass-ceramic regions 250 and secondary glass-ceramic regions 260. For example, a circumferential sidewall 208 having a relatively thin wall thickness, in all or one or more portions of body 201, may include more and/or larger secondary glass-ceramic regions 260 to achieve desired mechanical performance.

In some embodiments, containers according to the present disclosure include a circumferential sidewall that comprises an average wall thickness in the range of 1 mm (millimeters) to 2.5 mm. In some embodiments, the average wall thickness may be in the range of range of 1 mm to 2 mm. In some embodiments, the average wall thickness may be in the range of range of 1 mm to 1.8 mm. In some embodiments, the average wall thickness may be in the range of range of 1 mm to 1.5 mm. In some embodiments, the average wall thickness may be about 1 mm, 1.1 mm, 1.2 mm, 1.3 mm, 1.4 mm, 1.5 mm, 1.6 mm, 1.7 mm, 1.8 mm, 1.9 mm, 2 mm, 2.1 mm, 2.2 mm, 2.3 mm, 2.4 mm, 2.5 mm, or within any range having two of these values as endpoints. In some embodiments, a container having an internal volume in the range of 200 mL to 350 mL (e.g., a 200 mL to 350 mL baby bottle) may have a sidewall with such an average thickness.

As used herein "average wall thickness" means the integral of the thickness for a wall over the exterior surface area of the wall divided by the exterior surface area of the wall. Surface features formed on an exterior or interior surface of a wall, such as attachment mechanisms (e.g., threads formed on the wall) or a handle, are not included in the calculation of average wall thickness. In embodiments were a container has radial symmetry about a central vertical axis extending from a top end of the container to a bottom end of the container, the average wall thickness may be defined by the average wall thickness of a thickness profile of the wall measured on a vertical plane extending through the central vertical axis and bisecting the container from the top end of the container to the bottom end of the container. In such embodiments, the average wall thickness may be measured by cutting the container along the vertical plane and averaging the thickness of the thickness profile. Unless otherwise specified, the thickness of a wall is measured in a direction perpendicular to the exterior surface of the wall.

Average wall thickness may be measured by either of the following two methods. (1) A magnetic-ball measurement method. In this method, thickness is determined by measuring the distance of a reference ball to the sensor tip. A magnet attracts the reference ball which holds it exactly over the probe tip. And a Hall-effect sensor built into the probe measures the distance between the probe tip and reference ball. Magna-Mike 8500 manufactured by Olympus Corporation is an exemplary probe for performing magnetic-ball measurement of average wall thickness for containers discussed herein. The following formula may be used to express the average wall thickness when measured by a magnetic-ball measurement method:

$$T = \frac{\int_A^0 t dA}{A}$$

where T=average wall thickness, t=thickness, A=the exterior surface area of a container body. A magnetic-measurement method is the preferred method for a container lacking radial symmetry about a central axis of the container, however it may also be used to measure the average wall thickness for a container having radial symmetry about a central axis.

(2) Cutting the container along a vertical plane extending through a central vertical axis and bisecting the container from the top end of the container to the bottom end of the container and averaging the thickness of the container wall on the vertical plane. The cross-sectional shape of the container along the vertical plane may be referred to as a "thickness profile." In this method, the thickness of the thickness profile for a container is measured at a suitable number of representative points and these thickness values are averaged to determine an average wall thickness of the container. In a preferred method, the suitable number of thickness measurement is 20 or more. When measuring that averages thickness the points of measurement are preferably equally distributed along the thickness profile from one end of the profile to the other. This method is preferred for containers having radial symmetry about a central axis of the container. In both method (1) and (2), surface features formed on an exterior or interior surface of a wall, such as attachment mechanisms (e.g., threads formed on the wall), a handle, or other gripping features, such a bumps or grooves, are not included in the calculation of average wall thickness.

An average wall thickness having a value or range as discussed herein may facilitate the manufacture of lightweight containers by decreasing the volume of material needed to manufacture a container have suitable mechanical characteristics. Also, such an average wall thickness or range may facilitate the manufacture of a container with transparent portions by reducing the thickness of material through which light must travel in order to travel through a wall of the container.

In some embodiments, glass-ceramic articles (e.g., containers) according to the present disclosure include a body that is a single monolithic piece of glass-ceramic material. As used herein "single monolithic piece" means an article having a generally consistent composition across its volume. An article that is made by layering one or more materials, or by mechanically attaching different parts, is not considered a single monolithic piece. In other words, a body of glass-ceramic material that is a single monolithic piece is not manufactured using a lamination process and/or a mechanical attachment process. In such embodiments, the single monolithic piece of glass-ceramic material may define an outermost surface of the glass-ceramic container (i.e., the surface of the container in contact with the atmosphere) and an innermost surface of the glass-ceramic container (i.e., the surface of the container in contact with the contents of the container). Single monolithic pieces may be single integrally formed pieces, formed using, for example, a pressing, blowing, or molding process.

In some embodiments, article (e.g., containers) according to the present disclosure may include a body consisting essentially of a glass-ceramic material discussed herein. In some embodiments, articles (e.g., containers) according to the present disclosure may include a body consisting of a glass-ceramic material discussed herein.

Figures 5A, 5B:
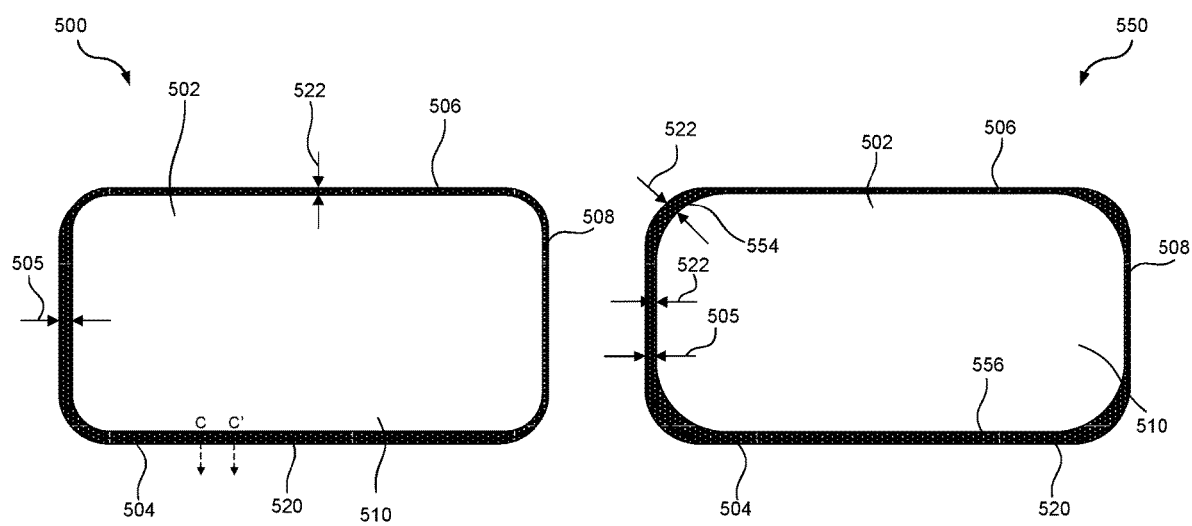
FIG. 5A illustrates an article according to some embodiments.
FIG. 5B illustrates an article according to some embodiments.

FIGS. 5A and 5B illustrate glass-ceramic articles 500 and 550 according to some embodiments. Glass-ceramic articles 500 and 550 may be glass-ceramic plates for protecting all or a portion of a consumer product. In some embodiments, articles 500 and 550 may be cover substrates for an electronic display, for example a light emitting diode (LED) display or an organic light emitting diode (OLED) display. In some embodiments, glass-ceramic articles 500 and 550 may be a non-strengthened glass-ceramic article, such as a glass-ceramic article that has not been subject to an ion-exchange process or a thermal tempering process.

Articles 500 and 550 include a top surface 502, a bottom surface 504, and a perimeter edge 506. Articles 500/550 may have a thickness 505, measured from top surface 502 to bottom surface 504, in the range of 200 microns (micrometers) to 1 micron, including subranges. For example, articles 500 and 550 may have a thickness 505 of 200 microns, 150 microns, 125 microns, 100 microns, 90 microns, 80 microns, 75 microns, 70 microns, 60 microns, 50 microns, 40 microns, 30 microns, 20 microns, 10 microns, 1 micron, or within a range having any two of these values as endpoints.

In some embodiments, articles 500 and 550 may have a thickness 505 in the range of 125 microns to 10 microns, for example 125 microns to 20 microns, or 125 microns to 30 microns, or 125 microns to 40 microns, or 125 microns to 50 microns, or 125 microns to 60 microns, or 125 microns to 70 microns, or 125 microns to 75 microns, or 125 microns to 80 microns, or 125 microns to 90 microns, or 125 microns to 100 microns. In some embodiments, articles 500 and 550 may have a thickness 505 in the range of 125 microns to 15 microns, for example 120 microns to 15 microns, or 110 microns to 15 microns, or 100 microns to 15 microns, or 90 microns to 15 microns, or 80 microns to 15 microns, or 70 microns to 15 microns, or 60 microns to 15 microns, or 50 microns to 15 microns, or 40 microns to 15 microns, or 30 microns to 15 microns. In some embodiments, articles 500 and 500 may have a thickness 505 within a range having any two of the values discussed in this paragraph as endpoints.

In some embodiments, glass-ceramic articles 500 and 550 may be an ultra-thin glass-ceramic article. As used herein, the term "ultra-thin glass-ceramic article" means a glass-ceramic article having a thickness in the range of 75 microns to 1 micron. In some embodiments, glass-ceramic articles 500 and 550 may be a flexible glass-ceramic article. As used herein, a flexible glass-ceramic article is an article having a bend radius, by itself, of less than or equal to 10 millimeters (mm). A glass-ceramic article achieves a bend radius of "X" if it resists failure when held at "X" radius for at least 60 minutes at about 25° C. and about 50% relative humidity.

Articles 500 and 550 include one or more primary glass-ceramic regions 510 and one or more secondary glass-ceramic regions 520. Primary and secondary glass-ceramic region(s) 510 and 520 have crystal phases and characteristics as described for primary and secondary glass-ceramic region(s) 120 and 130.

In some embodiments, a secondary glass-ceramic region 520 may define a perimeter edge 506 of articles 500 and 550. In some embodiments, a secondary glass-ceramic region 520 may define a perimeter region 508 of articles 500 and 550. In such embodiments, secondary glass-ceramic region 520 may provide increased fracture toughness and reduced optical transparency to perimeter edge 506 and/or perimeter region 508 of articles 500 and 550. In some embodiments, a secondary glass-ceramic region 520 may have a width 522, measured from perimeter edge 506 towards a geometrical center of articles 500 and 550, in range of 1 mm (millimeter) to 20 mm, including subranges. For example, secondary glass-ceramic region 520 may have a width of 1 mm, 2.5 mm, 5 mm, 7.5 mm, 10 mm, 12.5 mm, 15 mm, 17.5 mm, 20 mm or within any range having any two of these values as endpoints.

In some embodiments, secondary glass-ceramic region 520 may have a constant width 522. For example, as shown in FIG. 5A, secondary glass-ceramic region 520 has a constant width 522 around perimeter edge 506 of article 500. In some embodiments, width 522 of secondary glass-ceramic region 520 may vary. In such embodiments, areas of increased width 522 may provide additional fracture toughness and reduced optical transparency to specific portions of perimeter region 508.

Glass-ceramic article 550 shown in FIG. 5B includes an exemplary secondary glass-ceramic region 520 having corner portions 554 with an increased width 522 compared to straight portions 556. Corner portions 554 of an article, such as a cover substrate, may be particularly vulnerable to mechanical stresses during use (e.g., mechanical stresses during a drop event). Increasing width 522 of secondary glass-ceramic region 520 in corner portions 554 may help reduce the formation and propagation of cracks in corner portions 554. In some embodiments, article 500 or article 550 may include secondary glass-ceramic region(s) 520 located at only certain portions of perimeter region 508 (e.g., only at corner portions 554).

In some embodiments, secondary glass-ceramic region(s) 520 may serve to mask certain areas of glass-ceramic articles 500 and 550 for a consumer product, for example to create a border of a display screen, or visually divide different optically transparent areas (e.g., areas defined by primary glass-ceramic regions 510) of glass-ceramic articles 500 and 550. In some embodiments, secondary glass-ceramic region(s) 520 may impart a desired pattern, functional indicia, and/or logo on glass-ceramic articles 500 and 550.

Figure 6A:
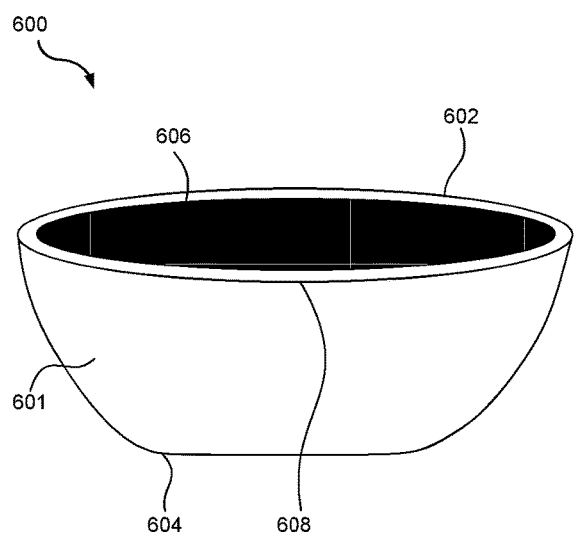
FIG. 6A illustrates a bowl according to some embodiments.

FIG. 6A illustrates a glass-ceramic container 600 according to some embodiments. Glass-ceramic container 600 includes a body 601 with a top end 602, a bottom end 604, and a circumferential sidewall 608 in the shape of a bowl. Body 601 defines a hollow interior 606 for receiving contents of container 600.

Similar to body 201, body 601 of container 600 may include one or more primary glass-ceramic regions and one or more secondary glass-ceramic regions. For example, top end 602 of body 601 may be defined by a secondary glass-ceramic region for providing increased fracture toughness to top end 602, which may be subject to high stresses during use. As another example, a portion of bottom end 604 of body 601 may be defined by a secondary glass-ceramic region for providing increased fracture toughness to bottom end 604, which may be subject to high impact stresses during use (e.g., impact stresses resulting from placing container 600 on a counter-top).

Figure 6B:
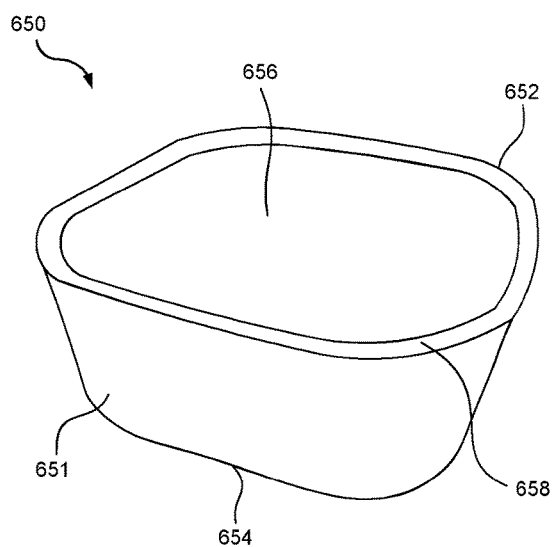
FIG. 6B illustrates a tub according to some embodiments.

FIG. 6B illustrates a glass-ceramic container 650 according to some embodiments. Glass-ceramic container 650 includes a body 651 with a top end 652, a bottom end 654, and a circumferential sidewall 658 in the shape of a tub. Body 651 defines a hollow interior 656 for receiving contents of container 650.

Also similar to body 201, body 651 of container 650 may include one or more primary glass-ceramic regions and one or more secondary glass-ceramic regions. For example, a portion of bottom end 654 of body 651 may be defined by a secondary glass-ceramic region for providing increased fracture toughness to bottom end 654, which may be subject to high impact stresses during use (e.g., impact stresses resulting from placing container 650 on a counter-top). As another example, portions of body 651 other than bottom end 654 may be defined by a primary glass-ceramic region for allowing contents of container 600 to be easily viewed during use.

FIGS. 7A-7D illustrate various cross-sections 700, 720, 740, and 760 of secondary glass-ceramic regions according to various embodiments. The cross-sections 700, 720, 740, and 760 illustrate cross-sectional areas taken along representative lines B-B' and C-C' in FIGS. 2A and 5A, respectively. So, for purposes of reference, the left-hand edge the cross-sections represents exterior surface 210 of container 200 and top surface 502 of article 500, and the right-hand side of the cross-sections represents interior surface 212 of container 200 and bottom surface 504 of article 500. Also, for illustration purposes, cross-sections are shown as rectangles. However, the shape of a cross-section for a glass-ceramic article will depend on the shape of the glass-ceramic article. While the cross-sections 700, 720, 740, and 760 are illustrated as being taken from container 200 and article 500, any glass-ceramic article discussed herein may have a cross-sectional area as described for cross-sections 700, 720, 740, and 760.

The secondary crystal phase areas of cross-sections 700, 720, 740, and 760 may be formed using a ceramming process including laser ceramming, fire polishing, direct contact (conduction) heating, or local shielded oven ceramming. For cross-section 720 in particular, a laser ceramming process may be used to form the secondary crystal phase area defining a central area of cross-section 720. In some embodiments, the type of ceramming process(es) utilized may be selected to provide desired exterior and/or interior surface roughness for an article. Laser ceramming may be utilized to form relatively rough surfaces while fire polishing, direct contact (conduction) heating, or local shielded oven ceramming may be utilized to form relatively smooth surfaces.

Cross-section 700 illustrates a secondary crystal phase area 706 defined by secondary crystal phases of a glass-ceramic material. The maximum thickness 708 of secondary crystal phase area 706 is equal to the maximum thickness of cross-section 700 because secondary crystal phase area 706 defines the entirety of cross-section 700. In other words, secondary crystal phase area 706 defines the entire thickness of an article between opposite surfaces of the article (e.g., through the wall thickness of the article). In some embodiments, secondary crystal phase area 706 may be a patterned area, for example, like the patterned areas discussed in reference to FIGS. 8A and 8C.

Cross-section 720 illustrates a secondary crystal phase area 726 defined by secondary crystal phases of a glass-ceramic material and having a maximum thickness 728 less than the maximum thickness of cross-section 720. The remaining area of cross-section is occupied by primary crystal phases areas 722. In particular, secondary crystal phase area 726 defines a central area of cross-section 720 between an interior primary crystal phase area 722*i* having a maximum thickness 724*i* and an exterior primary crystal phase area 722*e* having a maximum thickness 724*e*. In some embodiments, thickness 724*i* and thickness 724*e* may be the same. In some embodiments, thickness 724*i* and thickness 724*e* may be different.

In some embodiments, secondary crystal phase area 726 may have a maximum thickness 728 in the range of 1 micron to 1 mm, including subranges. For example, thickness 728 may be 1 micron, 50 microns, 100 microns, 200 microns, 300 microns, 400 microns, 500 microns, 600 microns, 700 microns, 800 microns, 900 microns, or 1 mm, or within a range having any two of these values as endpoints. In some embodiments, secondary crystal phase area 726 may have a maximum thickness 728 that is at least 10% of the maximum thickness of cross-section 720. In some embodiments, secondary crystal phase area 726 may have a maximum thickness 728 that is the range of 10% to 90% of the maximum thickness of cross-section 720 including subranges. For example, thickness 728 may be 25%, 30%, 33%, 40%, 50%, 60%, 67%, 70%, 75%, 80%, or 90% of the maximum thickness of cross-section 720, or within a range having any two of these values as endpoints. In some embodiments, secondary crystal phase area 726 may be a patterned area, for example, like the patterned areas discussed in reference to FIGS. 8B and 8D. In some embodiments, a glass ceramic article may include a plurality of secondary crystal phase areas 726 in a cross-section. For example, in such embodiments, a glass-ceramic article may include layered secondary crystal phase areas 726 and primary crystal phases areas 722.

Cross-section 740 illustrates a secondary crystal phase area 746 defined by secondary crystal phases of a glass-ceramic material and having a maximum thickness 748 less than the maximum thickness of cross-section 740. The remaining area of cross-section 740 is occupied by a primary crystal phase area 742 having a thickness 744. In cross-section 740, secondary crystal phase area 746 defines the exterior surface of cross-section 740. Cross-section 760 illustrates a secondary crystal phase area 766 defined by secondary crystal phases of a glass-ceramic material and having a maximum thickness 768 less than the maximum thickness of cross-section 760. The remaining area of cross-section 760 is occupied by a primary crystal phase area 762 having a thickness 764. In cross-section 760, secondary crystal phase area 766 defines the interior surface of cross-section 760. The values for thicknesses 748 and 768 may be the same as the values described for thickness 728. In some embodiments, secondary crystal phase areas 746 and 766 may be a patterned area, for example, like the patterned areas discussed in reference to FIGS. 8B and 8D.

FIGS. 8A-8D illustrate various cross-sections 800, 820, 840, and 860 of patterned secondary glass-ceramic regions according to various embodiments. As illustrated in exemplary cross-sections 800, 820, 840, and 860, patterned secondary glass-ceramic regions have cross-sectional areas including secondary crystal phase areas intermixed with primary crystal phase area(s). In some embodiments, the pattern of a patterned secondary glass-ceramic region may be an ordered and/or repeated pattern. In some embodiments, the pattern of a patterned secondary glass-ceramic region may be an un-ordered and/or non-repeating pattern. In some embodiments, the pattern of a patterned secondary glass-ceramic region may be a gradient pattern having varying density of secondary crystal phase areas within the pattern. For example, in some embodiments, a gradient pattern may have an increased density of secondary crystal phase areas adjacent to an exterior surface of an article, or vice versa. In other words, the density of secondary crystal phase areas may decrease when moving through the wall thickness of an article from an exterior surface of the article to an interior surface of the article, or vice versa.

Similar to cross-sections 700, 720, 740, and 760, cross-sections 800, 820, 840, and 860 are cross-sections taken along representative lines B-B' and C-C' in FIGS. 2A and 5A, respectively. So, for purposes of reference, the left-hand edge the cross-sections represents exterior surface 210 of container 200 and top surface 502 of article 500, and the right-hand side of the cross-sections represents interior surface 212 of container 200 and bottom surface 504 of article 500. Also, for illustration purposes, cross-sections are shown as rectangles. However, the shape of a cross-section for a glass-ceramic article will depend on the shape of the glass-ceramic article. While the cross-sections 800, 820, 840, and 860 are illustrated as being taken from container 200 and article 500, any glass-ceramic article discussed herein may have a cross-sectional area as described for cross-sections 800, 820, 840, and 860.

The patterned secondary crystal phase areas of cross-sections 800, 820, 840, and 860 may be formed using a laser ceramming. In particular, the patterned areas may be formed by focusing a laser on particular areas on the surface and/or within a glass-ceramic article to locally heat and ceram the glass-ceramic material, and thus impart a particular pattern. While FIGS. 8A-8D illustrate patterns including rectangles and circles, any suitable pattern may be formed using laser ceramming.

Cross-section 800 illustrates a patterned secondary crystal phase area including secondary crystal phase areas 806 defined by secondary crystal phases of a glass-ceramic material intermixed with primary crystal phases 802. The maximum thickness 808 of secondary crystal phase areas 806 is equal to the maximum thickness of cross-section 800 because secondary crystal phase areas 806 extend across the entirety of cross-section 800. In other words, secondary crystal phase areas 806 extend across the entire thickness of an article between opposite surfaces of the article (e.g., through the wall thickness of the article).

Cross-section 820 illustrates a patterned secondary crystal phase area including a primary crystal phase areas 822 defined by primary crystal phases of a glass-ceramic material and secondary crystal phase areas 826 defined by secondary crystal phases of a glass-ceramic material intermixed with primary crystal phases. The patterned secondary crystal phase area has a maximum thickness 828 less than the maximum thickness of cross-section 820. In particular, the patterned secondary crystal phase area is located in a central area of cross-section 820 between primary crystal phase areas 822 disposed on interior and exterior sides of secondary crystal phase areas 826. The value for maximum thickness 828 of secondary crystal phase areas 826 may be the same as the values described for thickness 728.

Cross-section 840 illustrates a patterned secondary crystal phase area including secondary crystal phase areas 846 defined by secondary crystal phases of a glass-ceramic material intermixed with primary crystal phases 842. The maximum thickness 848 of secondary crystal phase areas 846 is equal to the maximum thickness of cross-section 840 because secondary crystal phase areas 846 are disposed across the entirety of cross-section 840. In other words, secondary crystal phase areas 846 are disposed across the entire thickness of an article between opposite surface of the article (e.g., through the wall thickness of the article).

Cross-section 860 illustrates a patterned secondary crystal phase area including a primary crystal phase areas 862 defined by primary crystal phases of a glass-ceramic material and secondary crystal phase areas 866 defined by secondary crystal phases of a glass-ceramic material intermixed with primary crystal phases. The patterned secondary crystal phase area includes a maximum thickness 868 less than the maximum thickness of cross-section 860. In particular, the patterned secondary crystal phase area defines a central area of cross-section 860 between primary crystal phase areas 862 disposed on interior and exterior sides of secondary crystal phase areas 866. The value for maximum thickness 868 of secondary crystal phase areas 866 may be the same as the values described for thickness 728.

Figures 9A, 9B, 9C:
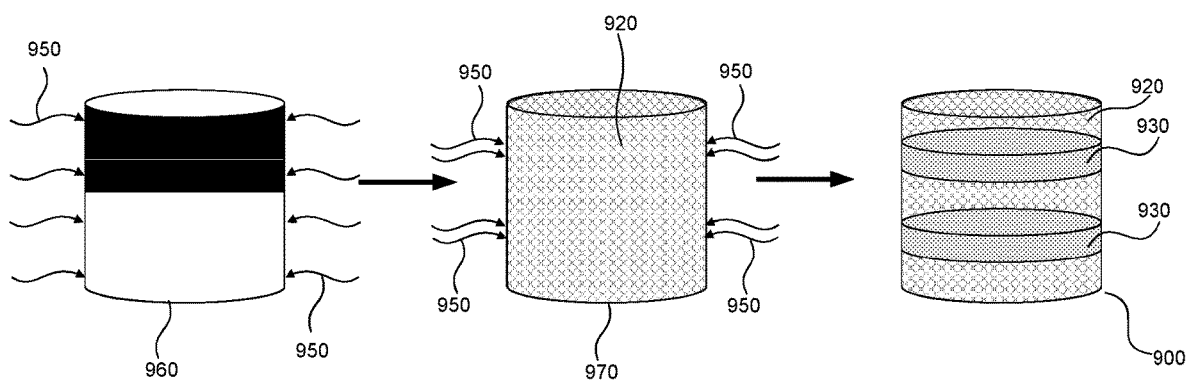
FIGS. 9A-9C illustrate a method of making a locally strengthened glass-ceramic article according to some embodiments.

FIGS. 9A-9C illustrate a method of making a glass-ceramic article 900 according to some embodiments. Glass-ceramic article 900 may be any glass-ceramic article discussed herein (e.g., a container or a cover substrate as discussed herein). In some embodiments, as shown in FIG. 9A, an entire unicerammed article 960 composed of a glass-ceramic material may be cerammed in a first ceramming cycle at a first temperature for a first length of time. During the first ceramming cycle, heat 950 may be applied to the entire article 960 to form primary crystal phases of a glass-ceramic material. Heat 950 be applied uniformly to article 960 by, for example, placing article 960 in a convection oven or by direct contact (conduction) heating. As a result, article 960 is transformed into glass-ceramic article 970 composed of primary crystal phases as shown in FIG. 9B.

Then, in some embodiments, after performing the first ceramming cycle, certain portions of glass-ceramic article 970 may be locally cerammed in a second ceramming cycle at a second temperature for a second length of time. During the second ceramming cycle, heat 950 may be applied to specific regions of article 970 to form secondary crystal phases. As a result, glass-ceramic article 970 is transformed into glass-ceramic article 900 composed of one or more primary glass-ceramic regions 920 with primary crystal phases and one or more secondary glass-ceramic regions 930 with secondary crystal phases as shown in FIG. 9C. Localized heat 950 may be applied by, for example, irradiating the article with a laser, fire polishing the article, direct contact heating, and/or in an oven with thermal shielding disposed around regions of the article not intended to be heated using the second ceramming cycle. In some embodiments, more than one "second" ceramming cycle may be performed. In such embodiments, each second cycle can be used to introduce a different level of ceramming to different regions and/or different or patterns.

In some embodiments, local ceramming to form secondary glass-ceramic region(s) may be performed prior to ceramming the entire article to form primary glass-ceramic region(s). In other words, the "second" ceramming cycle step shown in FIG. 9B may be performed prior to the "first" ceramming cycle step shown in FIG. 9A. In such embodiments, the "second" ceramming cycle may be performed at relatively low temperatures because the "first" ceramming cycle will continue the local crystallization of "second" ceramming cycle to produce secondary crystal phases.

Figure 10:
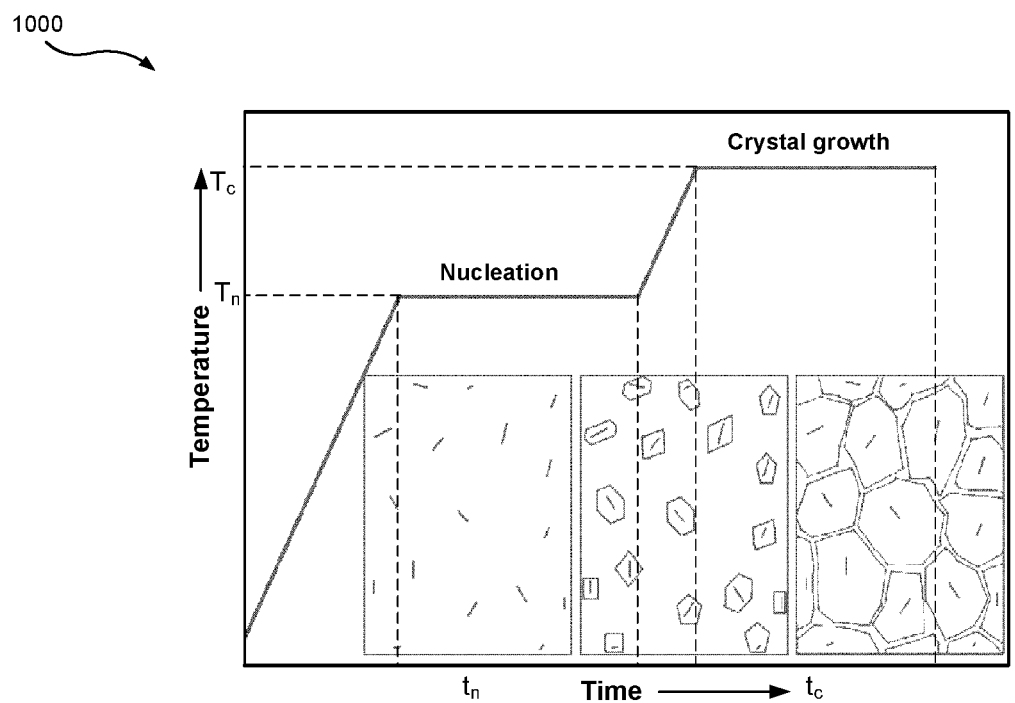
FIG. 10 is a graph of an exemplary ceramming cycle for a glass-ceramic material.

The time and temperature of first and second ceramming cycles are selected based on a ceramming cycle for a glass-ceramic material to produce desired crystal phases within the material. FIG. 10 illustrates an exemplary ceramming cycle 1000. The nucleation time/temperature (Tn/tn) and/or the crystallization time/temperature (Tc/tc) illustrated in FIG. 10 can be selected to produce primary crystal phases in a first ceramming cycle and secondary crystal phases in a second ceramming cycle. In some embodiments, the secondary ceramming cycle may be a continuation of the first ceramming cycle. For example, the second ceramming cycle may include increasing the ceramming temperature immediately after completion of the first ceramming cycle. In such embodiments, the second ceramming cycle may include only a crystallization step.

The first ceramming cycle may include heating an article including precursor glasses and/or a glass-ceramic at one or more preselected temperatures for one or more preselected times to induce glass homogenization and crystallization (i.e., nucleation and growth) of primary crystalline phases (e.g., having one or more compositions, amounts, morphologies, sizes or size distributions, etc.). In some embodiments, the first ceramming cycle may include (i) heating precursor glasses at a rate of 1-10° C./min to a glass pre-nucleation temperature: (ii) maintaining the crystallizable glasses at the glass pre-nucleation temperature for a time in a range (e.g., from about ¼ hr to about 4 hr) to produce pre-nucleated crystallizable glasses; (iii) heating the pre-nucleated crystallizable glasses at a rate of 1-10° C./min to nucleation temperature (Tn); (iv) maintaining the crystallizable glasses at the nucleation temperature for a time (tn) (e.g., in the range from between about ¼ hr to about 4 hr) to produce nucleated crystallizable glasses; (v) heating the nucleated crystallizable glasses at a rate in the range from about 1° C./min to about 10° C./min to a crystallization temperature (Tc); (vi) maintaining the nucleated crystallizable glasses at the crystallization temperature for a time (tc) (e.g., in the range from about ¼ hr to about 4 hr) to produce a glass-ceramic including primary crystal phases; and (vii) cooling the formed glass-ceramic to room temperature. Exemplary first ceramming cycles for exemplary glass-ceramic compositions are shown below in Tables 1 and 2.

As used herein, the term crystallization temperature may be used interchangeably with ceram or ceramming temperature. In addition, the terms "ceram" or "ceramming" in these embodiments, may be used to refer to steps (v), (vi) and optionally (vii), collectively. In some embodiments, for the first ceramming cycle, the glass pre-nucleation temperature can be about 540° C., the nucleation temperature can be about 600° C. or about 700° C. and the crystallization temperature of the first ceramming cycle can be in a range of 630° C. to 800° C., including subranges. For example, the crystallization temperature for the first ceramming cycle may be 630° C., 640° C., 650° C., 660° C., 680° C., 690° C., 700° C., 710° C., 720° C., 730° C., 740° C., 750° C., 760° C., 770° C., 780° C., 790° C., 800° C., or within a range having any two of these values as endpoints. In some embodiments, the first ceramming cycle does not include maintaining the crystallizable glasses at a glass pre-nucleation temperature.

In some embodiments, the second ceramming cycle may include heating an article including precursor glasses and/or a glass-ceramic at one or more preselected temperatures for one or more preselected times to induce glass homogenization and/or crystallization (i.e., nucleation and growth) of secondary crystalline phases (e.g., having one or more compositions, amounts, morphologies, sizes or size distributions, etc.). In some embodiments, the second ceramming cycle may include (i) heating precursor glasses at a rate of 1-10° C./min to a glass pre-nucleation temperature: (ii) maintaining the crystallizable glasses at the glass pre-nucleation temperature for a time in a range (e.g., from about ¼ hr to about 4 hr) to produce pre-nucleated crystallizable glasses; (iii) heating the pre-nucleated crystallizable glasses at a rate of 1-10° C./min to nucleation temperature (Tn); (iv) maintaining the crystallizable glasses at the nucleation temperature for a time (tn) (e.g., in the range from between about ¼ hr to about 4 hr) to produce nucleated crystallizable glasses; (v) heating the nucleated crystallizable glasses at a rate in the range from about 1° C./min to about 10° C./min to a crystallization temperature (Tc); (vi) maintaining the nucleated crystallizable glasses at the crystallization temperature for a time (tc) (e.g., in the range from about ¼ hr to about 4 hr) to produce a glass-ceramic including secondary crystal phases; and (vii) cooling the formed glass-ceramic to room temperature.

In the second ceramming cycle, a higher crystallization temperature and/or longer crystallization time may be utilized to form secondary crystal phases. In some embodiments, the crystallization temperature of the second ceramming cycle may be in the range of 750° C. to 1000° C. For example, the crystallization temperature for the second ceramming cycle may be 750° C., 760° C., 770° C., 780° C., 790° C., 800° C., 810° C., 820° C., 830° C., 840° C., 850° C., 860° C., 870° C., 880° C., 890° C., 900° C., 910° C., 920° C., 930° C., 940° C., 950° C., 960° C., 970° C., 980° C., 990° C., 1000° C., or within a range having any two of these values as endpoints. In general, the higher the crystallization temperature, the more secondary crystal phases are produced in a given time.

In some embodiments, the second ceramming cycle does not include maintaining the crystallizable glasses at a glass pre-nucleation temperature or maintaining the crystallizable glasses at a nucleation temperature. In such embodiments, the second ceramming cycle may only include an crystallization step. And in some embodiments, this single crystallization step may be performed immediately after the crystallization step of the first ceramming cycle. In some embodiments, the second ceramming cycle may include extending the crystallization time (tc) for a first ceramming cycle for a certain region, or regions, of a glass-ceramic to produce secondary glass-ceramic regions.

Temperature-temporal profile of heat treatment steps of heating to the crystallization temperature and maintaining the temperature at the crystallization temperature, in addition to precursor glass compositions, are judiciously prescribed so as to produce one or more of the following desired attributes: crystalline phase(s) of the glass-ceramic, proportions of one or more primary crystalline phases and/or one or more secondary crystalline phases and residual glass, crystal phase assemblages of one or more primary crystalline phases and/or one or more secondary crystalline phases and residual glass, and grain sizes or grain size distributions among one or more primary crystalline phases and/or one or more secondary crystalline phases, which in turn may influence the final integrity, quality, color, and/or opacity, of resultant formed glass-ceramic.

In some embodiments, the location, shape, and/or volume of secondary glass-ceramic regions may tailored to provide increased fracture toughness in areas subject to the highest stress levels during use. FIG. 11 illustrates a cross-section of glass-ceramic container 1100 according to some embodiments. Points 1110 and 1120 represent possible overload locations of glass-ceramic container 1100 in a drop event or due to a thermal shock. Other regions of container 1100 (e.g., the contracted region in the middle of container 11100) may not require any extra strength as those regions are not subjected to aggressive loading during use.

Points 1110 on an exterior surface 1112 of container 1100 may be subjected to overstress due to direct contact with a surface (e.g., ground) during a drop event. Points 1120 on an interior surface 1122 of container 1100 may be subjected to overstress due to local bending during a drop and/or thermal effects (e.g., thermal shock) during use. Points 1110 and 1120 can be determined by analyzing a particular container's shape, size, and weight, for example. Through such analysis and determination, the high stress regions of a container associated with high stress points (e.g., container 1100 associated with points 1110 and/or points 1120) may be locally ceramed to form secondary crystal phases as discussed herein. Similar analyses may be performed for any glass-ceramic article to determine overload locations of the article during use.

Figure 12:
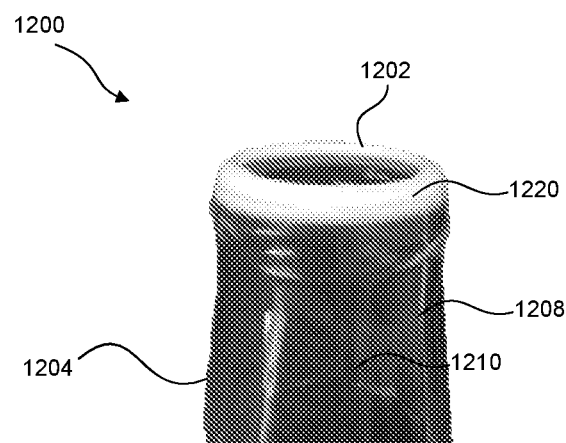
FIG. 12 is a photograph of a portion of a locally strengthened glass-ceramic container according to some embodiments.

FIG. 12 shows a portion of an exemplary glass-ceramic container 1200 including a secondary glass-ceramic region 1220 formed in a second ceramming cycle via fire polishing. Container 1200 includes a circumferential sidewall 1208 defining an open top end 1202 and a neck 1204 of container 1200. Neck 1204 of container is defined by a primary glass-ceramic region 1210 and open top end 1202 is defined by secondary glass-ceramic region 1220. Secondary glass-ceramic region 1220 increases the fracture toughness of open end 1202 thereby inhibiting the formation of cracks or fractures at open top end 1202, which may be subject to high stresses during use. As shown in FIG. 12, fire polishing produced a white secondary glass-ceramic region 1220 on container 1200.

Figure 13:
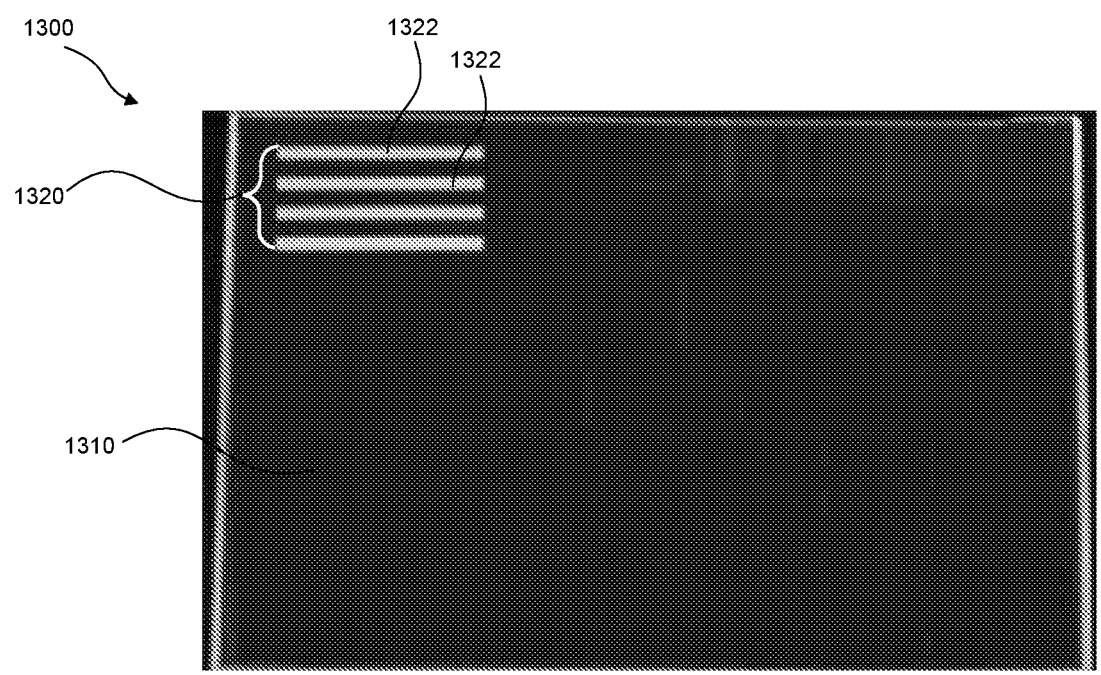
FIG. 13 is a photograph of a locally strengthened glass-ceramic article according to some embodiments.

FIG. 13 shows an exemplary glass-ceramic article 1300 including a patterned secondary glass-ceramic region 1320 formed via laser ceramming. Patterned glass-ceramic region 1320 includes a plurality second crystal phase regions 1322 formed within a primary glass-ceramic region 1310 of article 1300. The second crystal phase regions 1322 may be volumes of secondary crystal phases formed within the wall thickness of article 1300, for example, like secondary crystal phase area of FIG. 7B. As shown in FIG. 13, laser ceramming secondary glass-ceramic region 1320 produced a pattern including white, opaque regions 1322.

Figure 14:
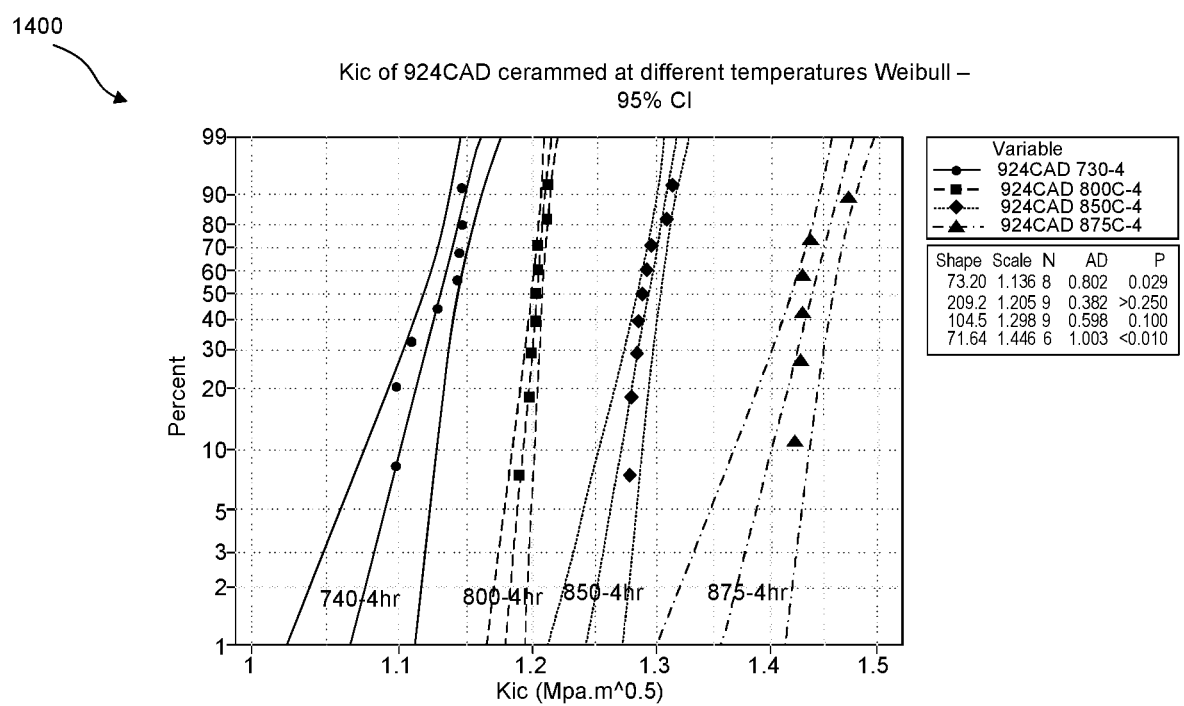
FIG. 14 is a Weibull plot of a glass-ceramic cerammed at different temperatures.

FIG. 14 shows a Weibull plot 1400 that illustrates the improved mechanical performance of secondary crystal phases for a glass-ceramic material as discussed herein. Plot 1400 shows the percent of glass-ceramic articles made of Composition 1 in Table 1 having a given fracture toughness for four different 4-hour ceramming cycles performed at different temperatures. As can be seen in FIG. 14, increasing the ceramming temperature increases the fracture toughness of Composition 1. While the transmittance of Composition 1 decreases as the ceramming temperature is increased, Composition 1 remained translucent up to 850 degrees C. It was observed that zirconia began to form in the composition at 800 degrees C. and above.

In some embodiments, glass-ceramic articles discussed herein (e.g., glass-ceramic articles 500 and 550) may be cover substrates for an electronic display. The electronic display may be, for example, a light emitting diode (LED) display or an organic light emitting diode (OLED) display. The cover substrate may be a 2D, 2.5D, or 3D cover substrate. As used herein, "2D cover substrate" includes a cover substrate having a perimeter edge with a chamfered shape on the top and/or bottom surfaces of the cover substrate adjacent to the perimeter edge. The chamfered shape on the top and/or bottom surfaces may be formed by, for example, a finishing method including mechanical grinding. A 2D cover substrate may have a chamfered shape on the top and bottom surfaces of the cover substrate that is the same or different.

As used herein, "2.5D cover substrate" means a cover substrate having a perimeter edge with a curved surface on its top (user-facing) side. The curved surface may be formed by, for example, a mechanical polishing method. The curved surface on the top side of a 2.5D cover substrate is smoother to the touch than a chamfered surface of a 2D cover substrate. As used herein, "3D cover substrate" means a cover substrate having a bent perimeter edge that forms a non-planar shape. The bent perimeter edge may be formed by, for example, thermal forming and/or cold-forming. A 3D cover substrate has a curved bottom surface and a curved top surface adjacent to the perimeter edge of the cover substrate. A 3D cover substrate refers to a cover substrate that holds a 3D shape as described herein at room temperature (23° C.) and when not being subject to an external force (e.g., a bending force). A flexible film that may deform under its own weight at room temperature is not considered a 3D cover substrate as described herein. Both 2.5D and 3D cover substrates have a topmost exterior surface that includes a substantially flat central area and a curved peripheral area disposed around all or portion of the substantially flat central area. A 3D cover substrate includes a bottommost exterior surface that includes a substantially flat central area and a curved peripheral area disposed around all or portion of the substantially flat central area.

Figure 15A:
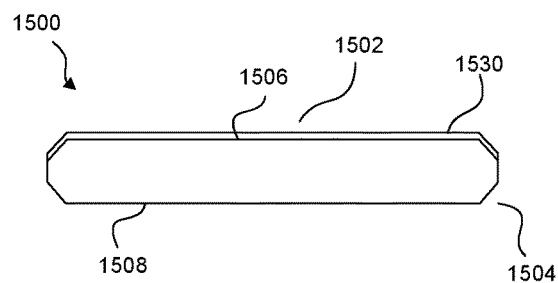
FIGS. 15A-15C illustrate cover substrates according to various embodiments.

FIG. 15A shows a 2D cover substrate 1500 according to some embodiments. Cover substrate 1500 includes a substantially flat central area 1502 a chamfered peripheral area 1504. Peripheral area 1504 of 2D cover substrate 1500 may be finished by a mechanical grinding method to create a chamfered shape on the top surface 1506 and/or bottom surface 1508 of cover substrate 1500. In some embodiments, the chamfered shape on top surface 1506 and bottom surface 1508 of cover substrate 1500 may be the same.

Figure 15B:
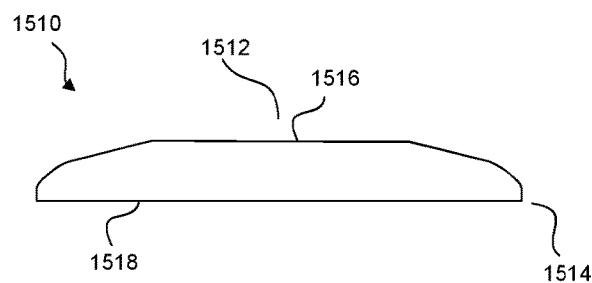

FIG. 15B shows a 2.5D cover substrate 1510 according to some embodiments. 2.5D cover substrate 1510 includes a substantially flat central area 1512 and a curved peripheral area 1514 on a top surface 1516 of cover substrate 1510. Curved peripheral area 1504 may be finished with a mechanical polishing method to form a curved surface on top surface 1516. As such, 2.5D cover substrate 1510 may have a peripheral area 1514 having a flat bottom surface 1518 and a curved top surface 1516. In some embodiments, a 2.5D cover substrate may be made by mechanically polishing a peripheral area of an optically transparent fiberglass composite layer and bonding an optically transparent hard-coat layer to the curved top surface.

Figure 15C:
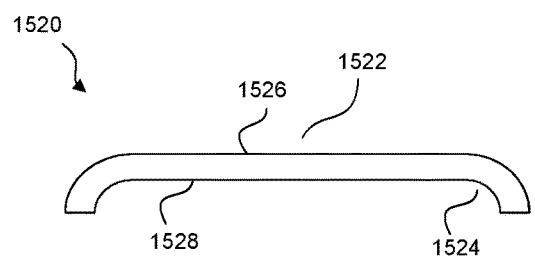

FIG. 15C shows a 3D cover substrate 1520 according to some embodiments. 3D cover substrate 1520 includes a substantially flat central area 1522 a curved peripheral area 1524. 3D cover substrate 1520 has a curved top surface 1526 and a curved bottom surface 1528 in curved peripheral area 1524. 3D cover substrate 1520 may be formed by, for example, molding an optically transparent fiberglass composite layer having a 3D shape and bonding an optically transparent hard-coat layer to the optically transparent fiberglass composite layer.

In some embodiments, for example as shown in FIG. 15A, a cover substrate may be coated with a coating layer 1530. In some embodiments, coating layer 1530 may be disposed on a top surface of a cover substrate (e.g., top surface 1506 of cover substrate 1500). In some embodiments, multiple coating layers 1530, of the same or different types, may be coated on a cover substrate.

In some embodiments, coating layer(s) 1530 may be a scratch resistant coating layer. Exemplary materials used in a scratch resistant coating layer may include an inorganic carbide, nitride, oxide, diamond-like material, or a combination thereof. In some embodiments, the scratch resistant coating layer may include a multilayer structure of aluminum oxynitride (AlON) and silicon dioxide ($SiO_2$). In some embodiments, the scratch resistant coating layer may include a metal oxide layer, a metal nitride layer, a metal carbide layer, a metal boride layer or a diamond-like carbon layer. Example metals for such an oxide, nitride, carbide or boride layer include boron, aluminum, silicon, titanium, vanadium, chromium, yttrium, zirconium, niobium, molybdenum, tin, hafnium, tantalum, and tungsten. In some embodiments, the coating layer may include an inorganic material. Non-limiting example inorganic layers include aluminum oxide and zirconium oxide layers.

In some embodiments, the scratch resistant coating layer may include a scratch resistant coating layer as described in U.S. Pat. No. 9,328,016, issued on May 3, 2016, which is hereby incorporated by reference in its entirety by reference thereto. In some embodiments, the scratch resistant coating layer may include a silicon-containing oxide, a silicon-containing nitride, an aluminum-containing nitride (e.g., AlN and $Al_xSi_yN$), an aluminum-containing oxy-nitride (e.g., $AlO_xN_y$ and $SiuAl_vOxN_y$), an aluminum-containing oxide or combinations thereof. In some embodiments, the scratch resistant coating layer may include transparent dielectric materials such as $SiO_2$, $GeO_2$, $Al_2O_3$, $Nb_2O_5$, $TiO_2$, $Y_2O_3$ and other similar materials and combinations thereof. In some embodiments, the scratch resistant coating layer may include a scratch resistant coating layer as described in U.S. Pat. No. 9,110,230, issued on Aug. 18, 2015, which is hereby incorporated by reference in its entirety by reference thereto. In some embodiments, the scratch resistant coating layer may include one or more of AlN, $Si_3N_4$, $AlO_xN_y$, $SiO_xN_y$, $Al_2O_3$, $Si_xC_y$, $Si_xO_yC_z$, $ZrO_2$, $TiO_xN_y$, diamond, diamond-like carbon, and $Si_uAl_vO_xN_y$. In some embodiments, the scratch resistant coating layer may include a scratch resistant coating layer as described in U.S. Pat. No. 9,359,261, issued on Jun. 7, 2016, or U.S. Pat. No. 9,335,444, issued on May 10, 2016, both of which are hereby incorporated by reference in their entirety by reference thereto.

In some embodiments, coating layer(s) 1530 may be an anti-reflection coating layer. Exemplary materials suitable for use in the anti-reflection coating layer include: $SiO_2$, $Al_2O_3$, $GeO_2$, SiO, $AlO_xN_y$, AlN, $SiN_x$, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, and other materials cited above as suitable for use in a scratch resistant layer. An anti-reflection coating layer may include sub-layers of different materials.

In some embodiments, the anti-reflection coating layer may include a hexagonally packed nanoparticle layer, for example but not limited to, the hexagonally packed nanoparticle layers described in U.S. Pat. No. 9,272,947, issued Mar. 1, 2016, which is hereby incorporated by reference in its entirety by reference thereto In some embodiments, the anti-reflection coating layer may include a nanoporous Si-containing coating layer, for example but not limited to the nanoporous Si-containing coating layers described in WO2013/106629, published on Jul. 18, 2013, which is hereby incorporated by reference in its entirety by reference thereto. In some embodiments, the anti-reflection coating may include a multilayer coating, for example, but not limited to the multilayer coatings described in WO2013/106638, published on Jul. 18, 2013; WO2013/082488, published on Jun. 6, 2013; and U.S. Pat. No. 9,335,444, issued on May 10, 2016, all of which are hereby incorporated by reference in their entirety by reference thereto.

In some embodiments, coating layer(s) may be an easy-to-clean coating layer. In some embodiments, the easy-to-clean coating layer may include a material selected from the group consisting of fluoroalkylsilanes, perfluoropolyether alkoxy silanes, perfluoroalkyl alkoxy silanes, fluoroalkylsilane-(non-fluoroalkylsilane) copolymers, and mixtures of fluoroalkylsilanes. In some embodiments, the easy-to-clean coating layer may include one or more materials that are silanes of selected types containing perfluorinated groups, for example, perfluoroalkyl silanes of formula $(R_F)_y Si_{X4-y}$, where $R_F$ is a linear $C_6$-$C_{30}$ perfluoroalkyl group, X=Cl, acetoxy, —$OCH_3$, and —$OCH_2CH_3$, and y=2 or 3. The perfluoroalkyl silanes can be obtained commercially from many vendors including Dow-Corning (for example fluorocarbons 2604 and 2634), 3M Company (for example ECC-1000 and ECC-4000), and other fluorocarbon suppliers such as Daikin Corporation, Ceko (South Korea), Cotec-GmbH (DURALON UltraTec materials) and Evonik. In some embodiments, the easy-to-clean coating layer may include an easy-to-clean coating layer as described in WO2013/082477, published on Jun. 6, 2013, which is hereby incorporated by reference in its entirety by reference thereto.

In some embodiments, coating layer(s) 1530 may be an anti-glare layer disposed over a top surface of a cover substrate. Suitable anti-glare layers include, but are not limited to, the anti-glare layers prepared by the processes described in U.S. Pat. Pub. Nos. 2010/0246016, 2011/0062849, 2011/0267697, 2011/0267698, 2015/0198752, and 2012/0281292, all of which are hereby incorporated by reference in their entirety by reference thereto.

In some embodiments, coating layer(s) 1530 may be an anti-fingerprint coating layer. Suitable anti-fingerprint coating layers include, but are not limited to, oleophobic surface layers including gas-trapping features, as described in, for example, U.S. Pat. App. Pub. No. 2011/0206903, published Aug. 25, 2011, and oleophilic coatings formed from an uncured or partially-cured siloxane coating precursor comprising an inorganic side chain that is reactive with the surface of a glass-ceramic substrate (e.g., partially-cured linear alkyl siloxane), as described in, for example, U.S. Pat. App. Pub. No. 2013/0130004, published May 23, 2013. The contents of U.S. Pat. App. Pub. No. 2011/0206903 and U.S. Pat. App. Pub. No. 2013/0130004 are incorporated herein by reference in their entirety.

In some embodiments, coating layer(s) 1530 may be an anti-microbial/viral layer formed over a top surface of a cover substrate. Suitable anti-microbial/viral layers include, but are not limited to, an antimicrobial Ag+ region extending from the surface of the glass article to a depth in the glass article having a suitable concentration of Ag+1 ions on the surface of the glass article, as described in, for example, U.S. Pat. App. Pub. No. 2012/0034435, published Feb. 9, 2012, and U.S. Pat. App. Pub. No. 2015/0118276, published Apr. 30, 2015. The contents of U.S. Pat. App. Pub. No. 2012/0034435 and U.S. Pat. App. Pub. No. 2015/0118276 are incorporated herein by reference in their entirety.

Figure 16:
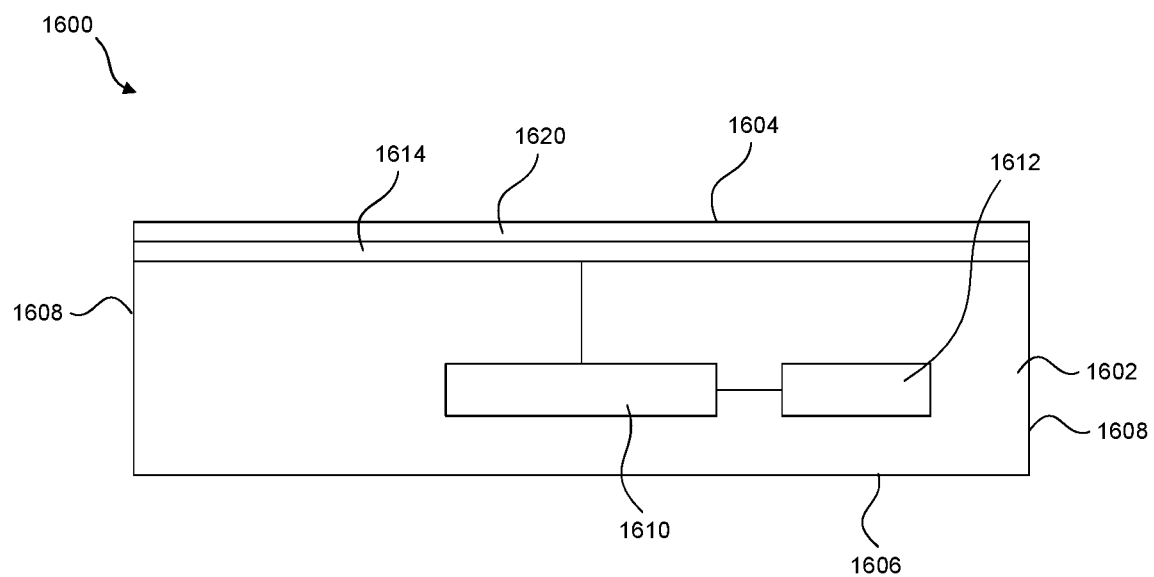
FIG. 16 illustrates a consumer product according to some embodiments.

FIG. 16 shows a consumer electronic product 1600 according to some embodiments. Consumer electronic product 1600 may include a housing 1602 having a front (user-facing) surface 1604, a back surface 1606, and side surfaces 1608. Electrical components may be provided at least partially within housing 1602. The electrical components may include, among others, a controller 1610, a memory 1612, and display components, including a display 1614. In some embodiments, display 1614 may be provided at or adjacent to front surface 1604 of housing 1602.

As shown for example in FIG. 16, consumer electronic product 1600 may include a cover substrate 1620. Cover substrate 1620 may serve to protect display 1614 and other components of electronic product 1600 (e.g., controller 1610 and memory 1612) from damage. In some embodiments, cover substrate 1620 may be disposed over display 1614. In some embodiments, cover substrate 1620 may be bonded to display 1614. In some embodiments, cover substrate 1620 may be a cover substrate defined in whole or in part by a cover substrate discussed herein. Cover substrate 1620 may be a 2D, 2.5D, or 3D cover substrate. In some embodiments, cover substrate 1620 may define front surface 1604 of housing 1602. In some embodiments, cover substrate 1620 may define front surface 1604 of housing 1602 and all or a portion of side surfaces 1608 of housing 1602. In some embodiments, consumer electronic product 1600 may include a cover substrate defining all or a portion of back surface 1606 of housing 1602.

Glass-ceramic materials (and their precursor glass materials) suitable for manufacturing glass-ceramic articles discussed herein are as follows. Articles formed from these glass-ceramic compositions may be subject to the ceramming process(es) discussed herein to create regions having different crystal structures, e.g., one or more primary glass-ceramic regions and one or more secondary glass-ceramic regions. Also, articles formed of these materials may have the material and/or chemical properties (e.g., fracture toughness) discussed herein.

Suitable glass-ceramic materials include transparent or translucent lithium-containing aluminosilicate glass-ceramic compositions that have petalite and lithium silicate as the primary crystal phases. The lithium silicate crystal phase may be lithium disilicate or lithium metasilicate. Improved properties of the glass-ceramic compositions described herein include: 1) the glass retains a low melting temperature (below 1500° C.), yet provides a higher liquidus viscosity (>2000 poise) and a long working range that is compatible with conventional rolling, molding, and float processes; 2) lithium silicate is retained as a major crystal phase, providing inherently high mechanical strength and fracture toughness to the glass-ceramic; and 3) petalite is a second major crystal phase and has a fine grain size, which contributes to the transparency or translucency of the glass-ceramic, and also can be ion-exchanged for additional mechanical strength. Additionally, the materials can be cerammed into shapes with minimal deformation, readily machined to precision shapes, cut, drilled, chamfered, tapped, polished to high luster with conventional ceramic machining tooling and even exhibit various degrees of translucency depending on composition and heat treatment. The glass-ceramics can be formed in three-dimensional containers using various methods due to its lower viscosity. In some embodiments, the glass-ceramic compositions may include 70% or more crystalline material by volume. In some embodiments, the glass-ceramic compositions may include 75% or more, 85% or more, 90% or more, 95% or more, or 98% or more crystalline material by volume.

Petalite, $LiAlSi_4O_{10}$, is a monoclinic crystal possessing a three-dimensional framework structure with a layered structure having folded $Si_2O_5$ layers linked by Li and Al tetrahedra. The Li is in tetrahedral coordination with oxygen. The mineral petalite is a lithium source and is used as a low thermal expansion phase to improve the thermal downshock resistance of glass-ceramic or ceramic parts. In some embodiments, glass-ceramic containers based on the petalite phase can be chemically strengthened in a salt bath, during which Na+ (and/or K+) replaces Li+ in the petalite structure, which causes surface compression and strengthening. In some embodiments, the weight percentage of the petalite crystalline phase in the glass-ceramic compositions can be in a range from about 20 to about 70 wt %, about 20 to about 65 wt %, about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 70 wt %, about 25 to about 65 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 70 wt %, about 30 to about 65 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 70 wt %, about 35 to about 65 wt %, about 35 to about 60 wt %, about 35 to about 55 wt %, about 35 to about 50 wt %, about 35 to about 45 wt %, about 35 to about 40 wt %, about 40 to about 70 wt %, about 40 to about 65 wt %, about 40 to about 60 wt %, about 40 to about 55 wt %, about 40 to about 50 wt %, about 40 to about 45 wt %, about 45 to about 70 wt %, about 45 to about 65 wt %, about 45 to about 60 wt %, about 45 to about 55 wt %, about 45 to about 50 wt %, about 50 to about 70 wt %, about 50 to about 65 wt %, about 50 to about 60 wt %, about 50 to about 55 wt %, about 55 to about 70 wt %, about 55 to about 65 wt %, about 55 to about 60 wt %, about 60 to about 70 wt %, about 60 to about 65 wt %, or about 65 to about 70 wt %. In some embodiments, the glass-ceramic has about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt % petalite crystalline phase.

The lithium silicate crystalline phase may be lithium disilicate or lithium metasilicate. Lithium disilicate, $Li_2Si_2O_5$, is an orthorhombic crystal based on corrugated sheets of $\{Si_2O_5\}$ tetrahedral arrays. The crystals are typically tabular or lath-like in shape, with pronounced cleavage planes. Glass-ceramics based on lithium disilicate offer highly desirable mechanical properties, including high body strength and fracture toughness, due to their microstructures of randomly-oriented interlocked crystals—a crystal structure that forces cracks to propagate through the material via tortuous paths around these crystals. Lithium metasilicate, $Li_2SiO_3$, has an orthorhombic symmetry with $(Si_2O_6)$ chains running parallel to the c axis and linked together by lithium ions. Lithium metasilicate crystals can be easily dissolved from glass-ceramics in diluted hydrofluoric acid. In some embodiments, the weight percentage of the lithium silicate crystalline phase in the glass-ceramic compositions can be in a range from about 20 to about 60 wt %, about 20 to about 55 wt %, about 20 to about 50 wt %, about 20 to about 45 wt %, about 20 to about 40 wt %, about 20 to about 35 wt %, about 20 to about 30 wt %, about 20 to about 25 wt %, about 25 to about 60 wt %, about 25 to about 55 wt %, about 25 to about 50 wt %, about 25 to about 45 wt %, about 25 to about 40 wt %, about 25 to about 35 wt %, about 25 to about 30 wt %, about 30 to about 60 wt %, about 30 to about 55 wt %, about 30 to about 50 wt %, about 30 to about 45 wt %, about 30 to about 40 wt %, about 30 to about 35 wt %, about 35 to about 60 wt %, about 35 to about 55 wt %, about 35 to about 50 wt %, about 35 to about 45 wt %, about 35 to about 40 wt %, about 40 to about 60 wt %, about 40 to about 55 wt %, about 40 to about 50 wt %, about 40 to about 45 wt %, about 45 to about 60 wt %, about 45 to about 55 wt %, about 45 to about 50 wt %, about 50 to about 60 wt %, about 50 to about 55 wt %, or about 55 to about 60 wt %. In some embodiments, the glass-ceramic has 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt % lithium silicate crystalline phase.

There are two broad families of lithium disilicate glass-ceramics. The first group comprises those that are doped with ceria and a noble metal such as silver. These can be photosensitively nucleated via UV light and subsequently heat-treated to produce strong glass-ceramics such as Fotoceram®. The second family of lithium disilicate glass-ceramics is nucleated by the addition of $P_2O_5$, wherein the nucleating phase is $Li_3PO_4$. $P_2O_5$-nucleated lithium disilicate glass-ceramics have been developed for applications as varied as high-temperature sealing materials, disks for computer hard drives, transparent armor, and dental applications.

The glass-ceramics described herein may be generically described as lithium-containing aluminosilicate glass-ceramics and comprise $SiO_2$, $Al_2O_3$, and $Li_2O$. In addition to $SiO_2$, $Al_2O_3$, and $Li_2O$, the glass-ceramics embodied herein may further contain alkali salts, such as $Na_2O$, $K_2O$, $Rb_2O$, or $Cs_2O$, as well as $P_2O_5$, and $ZrO_2$ and a number of other components as described below. In one or more embodiments, the major crystallite phases include petalite and lithium silicate, but β-spodumene ss, β-quartz ss, lithium phosphate, cristobalite, and rutile may also be present as minor phases depending on the compositions of the precursor glass-ceramic. In some embodiments, the glass-ceramic composition has a residual glass content of about 5 to about 30 wt %, about 5 to about 25 wt %, about 5 to about 20 wt %, about 5 to about 15 wt % about 5 to about 10 wt %, about 10 to about 30 wt %, about 10 to about 25 wt %, about 10 to about 20 wt %, about 10 to about 15 wt %, about 15 to about 30 wt %, about 15 to about 25 wt %, about 15 to about 20 wt %, about 20 to about 30 wt % about 20 to about 25 wt %, or about 25 to about 30 wt %. In some embodiments the residual glass content can be 5, 6, 7, 8, 9, 10, 11, 12, 13, 14, 15, 16, 17, 18, 19, 20, 21, 22, 23, 24, 25, 26, 27, 28, 29, or 30 wt %.

$SiO_2$, an oxide involved in the formation of glass, can function to stabilize the networking structure of glass-ceramics. In some embodiments, the glass-ceramic composition comprises from about 55 to about 80 wt % $SiO_2$. In some embodiments, the glass-ceramic composition comprises from 69 to about 80 wt % $SiO_2$. In some embodiments, the glass-ceramic composition can comprise from about 55 to about 80 wt %, about 55 to about 77 wt %, about 55 to about 75 wt %, about 55 to about 73 wt %, 60 to about 80 wt %, about 60 to about 77 wt %, about 60 to about 75 wt %, about 60 to about 73 wt %, 65 to about 80 wt %, about 65 to about 77 wt %, about 65 to about 75 wt %, about 65 to about 73 wt %, 69 to about 80 wt %, about 69 to about 77 wt %, about 69 to about 75 wt %, about 69 to about 73 wt %, about 70 to about 80 wt %, about 70 to about 77 wt %, about 70 to about 75 wt %, about 70 to about 73 wt %, about 73 to about 80 wt %, about 73 to about 77 wt %, about 73 to about 75 wt %, about 75 to about 80 wt %, about 75 to about 77 wt %, or about 77 to about 80 wt %, $SiO_2$. In some embodiments, glass-ceramic composition comprises about 55, 56, 57, 58, 59, 60, 61, 62, 63, 64, 65, 66, 67, 68, 69, 70, 71, 72, 73, 74, 75, 76, 77, 78, 79, or 80, wt % $SiO_2$.

With respect to viscosity and mechanical performance, the viscosity and mechanical performance are influenced by glass compositions. In the glass-ceramics, $SiO_2$ serves as the primary glass-forming oxide for the precursor glass and can function to stabilize the networking structure of the glass-ceramic. The concentration of $SiO_2$ should be sufficiently high in order to form petalite crystal phase when the precursor glass is heat treated to convert to a glass-ceramic. The amount of $SiO_2$ may be limited to control melting temperature (200 poise temperature), as the melting temperature of pure $SiO_2$ or high-$SiO_2$ glasses is undesirably high.

$Al_2O_3$ may also provide stabilization to the network and also provides improved mechanical properties and chemical durability. If the amount of $Al_2O_3$ is too high, however, the fraction of lithium silicate crystals may be decreased, possibly to the extent that an interlocking structure cannot be formed. The amount of $Al_2O_3$ can be tailored to control viscosity. Further, if the amount of $Al_2O_3$ is too high, the viscosity of the melt is also generally increased. In some embodiments, the glass-ceramic composition can comprise from about 2 to about 20 wt % $Al_2O_3$. In some embodiments, the glass-ceramic composition can comprise from about 6 to about 9 wt % $Al_2O_3$. In some embodiments, the glass-ceramic composition can comprise from about 2 to about 20%, about 2 to about 18 wt %, about 2 to about 15 wt %, about 2 to about 12 wt %, about 2 to about 10 wt %, about 2 to about 9 wt %, about 2 to about 8 wt %, about 2 to about 5 wt %, about 5 to about 20%, about 5 to about 18 wt %, about 5 to about 15 wt %, about 5 to about 12 wt %, about 5 to about 10 wt %, about 5 to about 9 wt %, about 5 to about 8 wt %, about 6 to about 20%, about 6 to about 18 wt %, about 6 to about 15 wt %, about 6 to about 12 wt %, about 6 to about 10 wt %, about 6 to about 9 wt %, about 8 to about 20%, about 8 to about 18 wt %, about 8 to about 15 wt %, about 8 to about 12 wt %, about 8 to about 10 wt %, about 10 to about 20%, about 10 to about 18 wt %, about 10 to about 15 wt %, about 10 to about 12 wt %, about 12 to about 20%, about 12 to about 18 wt %, or about 12 to about 15 wt %, $Al_2O_3$. In some embodiments, the glass-ceramic composition can comprise about 2, 3, 4, 5, 6, 7, 8, 9, 10, 11, 12, 13, 14, 15, 16, 17, 18, 19, or 20 wt % $Al_2O_3$.

In the glass-ceramics herein, $Li_2O$ aids in forming both petalite and lithium silicate crystal phases. In fact, to obtain petalite and lithium silicate as the predominant crystal phases, it is desirable to have at least about 7 wt % $Li_2O$ in the composition. Additionally, it has been found that once $Li_2O$ gets too high—greater than about 15 wt %—the composition becomes very fluid. In some embodied compositions, the glass-ceramic can comprise from about 5 wt % to about 20 wt % $Li_2O$. In other embodiments, the glass-ceramic can comprise from about 10 wt % to about 14 wt % $Li_2O$. In some embodiments, the glass-ceramic composition can comprise from about 5 to about 20 wt %, about 5 to about 18 wt %, about 5 to about 16 wt %, about 5 to about 14 wt %, about 5 to about 12 wt %, about 5 to about 10 wt %, about 5 to about 8 wt %, 7 to about 20 wt %, about 7 to about 18 wt %, about 7 to about 16 wt %, about 7 to about 14 wt %, about 7 to about 12 wt %, about 7 to about 10 wt %, 10 to about 20 wt %, about 10 to about 18 wt %, about 10 to about 16 wt %, about 10 to about 14 wt %, about 10 to about 12 wt %, 12 to about 20 wt %, about 12 to about 18 wt %, about 12 to about 16 wt %, about 12 to about 14 wt %, 14 to about 20 wt %, about 14 to about 18 wt %, about 14 to about 16 wt %, about 16 to about 20 wt %, about 16 to about 18 wt %, or about 18 to about 20 wt % $Li_2O$. In some embodiments, the glass-ceramic composition can comprise about 5, 6, 7, 8, 9, 10, 11, 12, 13, 14, 15, 16, 17, 18, 19, or 20 wt % $Li_2O$.

As noted above, $Li_2O$ is generally useful for forming the embodied glass-ceramics, but the other alkali oxides tend to decrease glass-ceramic formation and form an aluminosilicate residual glass in the glass-ceramic. It has been found that more than about 5 wt % $Na_2O$ or $K_2O$, or combinations thereof, leads to an undesirable amount of residual glass which can lead to deformation during crystallization and undesirable microstructures from a mechanical property perspective. The composition of the residual glass may be tailored to control viscosity during crystallization, minimizing deformation or undesirable thermal expansion, or control microstructure properties. Therefore, in general, the compositions described herein have low amounts of non-lithium alkali oxides. In some embodiments, the glass-ceramic composition can comprise from about 0 to about 5 wt % $R_2O$, wherein R is one or more of the alkali cations Na and K. In some embodiments, the glass-ceramic composition can comprise from about 1 to about 3 wt % $R_2O$, wherein R is one or more of the alkali cations Na and K. In some embodiments, the glass-ceramic composition can comprise from 0 to about 5 wt %, 0 to 4 wt %, 0 to 3 wt %, 0 to about 2 wt %, 0 to about 1 wt %, >0 to about 5 wt %, >0 to about 4 wt %, >0 to about 3 wt %, >0 to about 2 wt %, >0 to about 1 wt %, about 1 to about 5 wt %, about 1 to about 4 wt %, about 1 to about 3 wt %, about 1 to about 2 wt %, about 2 to about 5 wt %, about 2 to about 4 wt %, about 2 to about 3 wt %, about 3 to about 5 wt %, about 3 to about 4 wt %, or about 4 to about 5 wt % $Na_2O$ or $K_2O$, or combinations thereof. In some embodiments, the glass-ceramic composition can comprise about 0, >0, 1, 2, 3, 4, or 5 wt % $R_2O$.

The glass-ceramic compositions can include $P_2O_5$. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body; however, if the concentration of $P_2O_5$ is too high, the devitrification, upon cooling during precursor glass forming, can be difficult to control. Embodiments can comprise from >0 to about 6 wt % $P_2O_5$. Other embodiments can comprise about 2 to about 4 wt % $P_2O_5$. Still other embodiments can comprise about 1.5 to about 2.5 wt % $P_2O_5$. Embodied compositions can comprise from 0 to about 6 wt %, 0 to about 5.5 wt %, 0 to about 5 wt %, 0 to about 4.5 wt %, 0 to about 4 wt %, 0 to about 3.5 wt %, 0 to about 3 wt %, 0 to about 2.5 wt %, 0 to about 2 wt %, 0 to about 1.5 wt %, 0 to about 1 wt %, >0 to about 6 wt %, >0 to about 5.5 wt %, >0 to about 5 wt %, >0 to about 4.5 wt %, >0 to about 4 wt %, >0 to about 3.5 wt %, >0 to about 3 wt %, >0 to about 2.5 wt %, >0 to about 2 wt %, >0 to about 1.5 wt %, >0 to about 1 wt %, about 0.5 to about 6 wt %, about 0.5 to about 5.5 wt %, about 0.5 to about 5 wt %, about 0.5 to about 4.5 wt %, about 0.5 to about 4 wt %, about 0.5 to about 3.5 wt, about 0.5 to about 3 wt %, about 0.5 to about 2.5 wt %, about 0.5 to about 2 wt %, about 0.5 to about 1.5 wt %, about 0.5 to about 1 wt %, about 1 to about 6 wt %, about 1 to about 5.5 wt %, about 1 to about 5 wt %, about 1 to about 4.5 wt %, about 1 to about 4 wt %, about 1 to about 3.5 wt %, about 1 to about 3 wt %, about 1 to about 2.5 wt %, about 1 to about 2 wt %, about 1 to about 1.5 wt %, about 1.5 to about 6 wt %, about 1.5 to about 5.5 wt %, about 1.5 to about 5 wt %, about 1.5 to about 4.5 wt %, about 1.5 to about 4 wt %, about 1.5 to about 3.5 wt %, about 1.5 to about 3 wt %, about 1.5 to about 2.5 wt %, about 1.5 to about 2 wt %, about 2 to about 6 wt %, about 2 to about 5.5 wt %, about 2 to about 5 wt %, about 2 to about 4.5 wt %, about 2 to about 4 wt %, about 2 to about 3.5 wt %, about 2 to about 3 wt %, about 2 to about 2.5 wt %, about 2.5 to about 6 wt %, about 2.5 to about 5.5 wt %, about 2.5 to about 5 wt %, about 2.5 to about 4.5 wt %, about 2.5 to about 4 wt %, about 2.5 to about 3.5 wt %, about 2.5 to about 3 wt %, about 3 to about 6 wt %, about 3 to about 5.5 wt %, about 3 to about 5 wt %, about 3 to about 4.5 wt %, about 3 to about 4 wt %, about 3 to about 3.5 wt %, about 3.5 to about 6 wt %, about 3.5 to about 5.5 wt %, about 3.5 to about 5 wt %, about 3.5 to about 4.5 wt %, about 3.5 to about 4 wt %, about 4 to about 6 wt %, about 4 to about 5.5 wt %, about 4 to about 5 wt %, about 4 to about 4.5 wt %, about 4.5 to about 6 wt %, about 4.5 to about 5.5 wt %, about 4.5 to about 5 wt %, about 5 to about 6 wt %, about 5 to about 5.5 wt %, or 5.5 to about 6 wt % $P_2O_5$. In some embodiments, the glass-ceramic composition can comprise about 0, >0, 0.5, 1, 1.5, 2, 2.5, 3, 3.5, 4, 4.5, 5, 5.5, or 6 wt % $P_2O_5$.

In the glass-ceramics herein, it is generally found that $ZrO_2$ can improve the stability of $Li_2O$—$Al_2O_3$—$SiO_2$—$P_2O_5$ glass by significantly reducing glass devitrification during forming and lowering liquidus temperature. At concentrations above 8 wt %, $ZrSiO_4$ can form a primary liquidus phase at a high temperature, which significantly lowers liquidus viscosity. Transparent glasses can be formed when the glass contains over 2 wt % $ZrO_2$. The addition of $ZrO_2$ can also help decrease the petalite grain size, which aids in the formation of a transparent glass-ceramic. In some embodiments, the glass-ceramic composition can comprise from about 0.2 to about 15 wt % $ZrO_2$. In some embodiments, the glass-ceramic composition can be from about 2 to about 4 wt % $ZrO_2$. In some embodiments, the glass-ceramic composition can comprise from about 0.2 to about 15 wt %, about 0.2 to about 12 wt %, about 0.2 to about 10 wt %, about 0.2 to about 8 wt %, about 0.2 to 6 wt %, about 0.2 to about 4 wt %, 0.5 to about 15 wt %, about 0.5 to about 12 wt %, about 0.5 to about 10 wt %, about 0.5 to about 8 wt %, about 0.5 to 6 wt %, about 0.5 to about 4 wt %, 1 to about 15 wt %, about 1 to about 12 wt %, about 1 to about 10 wt %, about 1 to about 8 wt %, about 1 to 6 wt %, about 1 to about 4 wt %, 2 to about 15 wt %, about 2 to about 12 wt %, about 2 to about 10 wt %, about 2 to about 8 wt %, about 2 to 6 wt %, about 2 to about 4 wt %, about 3 to about 15 wt %, about 3 to about 12 wt %, about 3 to about 10 wt %, about 3 to about 8 wt %, about 3 to 6 wt %, about 3 to about 4 wt %, about 4 to about 15 wt %, about 4 to about 12 wt %, about 4 to about 10 wt %, about 4 to about 8 wt %, about 4 to 6 wt %, about 8 to about 15 wt %, about 8 to about 12 wt %, about 8 to about 10 wt %, about 10 to about 15 wt %, about 10 to about 12 wt %, or about 12 to about 15 wt % $ZrO_2$. In some embodiments, the glass-ceramic composition can comprise about 0.2, 0.5, 1, 2, 3, 4, 5, 6, 7, 8, 9, 10, 11, 12, 13, 14, or 15 wt % $ZrO_2$.

$B_2O_3$ is conducive to providing a precursor glass with a low melting temperature. Furthermore, the addition of $B_2O_3$ in the precursor glass and thus the glass-ceramics helps achieve an interlocking crystal microstructure and can also improve the damage resistance of the glass-ceramic. When boron in the residual glass is not charge balanced by alkali oxides or divalent cation oxides, it will be in trigonal-coordination state (or three-coordinated boron), which opens up the structure of the glass. The network around these three-coordinated boron is not as rigid as tetrahedrally coordinated (or four-coordinated) boron. Without being bound by theory, it is believed that precursor glasses and glass-ceramics that include three-coordinated boron can tolerate some degree of deformation before crack formation. By tolerating some deformation, the Vickers indentation crack initiation values are increased. Fracture toughness of the precursor glasses and glass-ceramics that include three-coordinated boron may also be increased. Without being bound by theory, it is believed that the presence of boron in the residual glass of the glass-ceramic (and precursor glass) lowers the viscosity of the residual glass (or precursor glass), which facilitates the growth of lithium silicate crystals, especially large crystals having a high aspect ratio. A greater amount of three-coordinated boron (in relation to four-coordinated boron) is believed to result in glass-ceramics that exhibit a greater Vickers indentation crack initiation load. In some embodiments, the amount of three-coordinated boron (as a percent of total $B_2O_3$) may be about 40% or greater, 50% or greater, 75% or greater, about 85% or greater or even about 95% or greater. The amount of boron in general should be controlled to maintain chemical durability and mechanical strength of the cerammed bulk glass-ceramic.

In one or more embodiments, the glass-ceramic herein can comprise from 0 to about 10 wt % or from 0 to about 2 wt % $B_2O_3$. In some embodiments, the glass-ceramic composition can comprise from 0 to about 10 wt %, 0 to about 9 wt %, 0 to about 8 wt %, 0 to about 7 wt %, 0 to about 6 wt %, 0 to about 5 wt %, 0 to about 4 wt %, 0 0 to about 3 wt %, 0 to about 2 wt %, 0 to about 1 wt %, >0 to about 10 wt %, >0 to about 9 wt %, >0 to about 8 wt %, >0 to about 7 wt %, >0 to about 6 wt %, >0 to about 5 wt %, >0 to about 4 wt %, >0 to about 3 wt %, >0 to about 2 wt %, >0 to about 1 wt %, about 1 to about 10 wt %, about 1 to about 8 wt %, about 1 to about 6 wt %, about 1 to about 5 wt %, about 1 to about 4 wt %, about 1 to about 2 wt %, about 2 to about 10 wt %, about 2 to about 8 wt %, about 2 to about 6 wt %, about 2 to about 4 wt %, about 3 to about 10 wt %, about 3 to about 8 wt %, about 3 to about 6 wt %, about 3 to about 4 wt %, about 4 to about 5 wt %, about 5 wt % to about 8 wt %, about 5 wt % to about 7.5 wt %, about 5 wt % to about 6 wt %, or about 5 wt % to about 5.5 wt % $B_2O_3$. In some embodiments, the glass-ceramic composition can comprise about 0, >0, 1, 2, 3, 4, 5, 6, 7, 8, 9, or 10 wt % $B_2O_3$.

MgO can enter petalite crystals in a partial solid solution. In one or more embodiments, the glass-ceramics herein can comprise from 0 to about 8 wt % MgO. In some embodiments, the glass-ceramic composition can comprise from 0 to about 8 wt %, 0 to about 7 wt %, 0 to about 6 wt %, 0 to about 5 wt %, 0 to about 4 wt %, 0 to about 3 wt %, 0 to about 2 wt %, 0 to about 1 wt %, about 1 to about 8 wt %, about 1 to about 7 wt %, about 1 to about 6 wt %, about 1 to about 5 wt %, about 1 to about 4 wt %, about 1 to about 3 wt %, about 1 to about 2 wt %, about 2 to about 8 wt %, about 2 to about 7 wt %, about 2 to about 6 wt %, about 2 to about 5 wt %, about 2 to about 4 wt %, about 2 to about 3 wt %, about 3 to about 8 wt %, about 3 to about 7 wt %, about 3 to about 6 wt %, about 3 to about 5 wt %, about 3 to about 4 wt %, about 4 to about 8 wt %, about 4 to about 7 wt %, about 4 to about 6 wt %, about 4 to about 5 wt %, about 5 to about 8 wt %, about 5 to about 7 wt %, about 5 to about 6 wt %, about 6 to about 8 wt %, about 6 to about 7 wt %, or about 7 wt % to about 8 wt % MgO. In some embodiments, the glass-ceramic composition can comprise about 0, >0, 1, 2, 3, 4, 5, 6, 7, or 8 wt % MgO.

ZnO can enter petalite crystals in a partial solid solution. In one or more embodiments, the glass-ceramics herein can comprise from 0 to about 10 wt % ZnO. In some embodiments, the glass-ceramic composition can comprise from 0 to about 10 wt %, 0 to about 9 wt %, 0 to about 8 wt %, 0 to about 7 wt %, 0 to about 6 wt %, 0 to about 5 wt %, 0 to about 4 wt %, 0 to about 3 wt %, 0 to about 2 wt %, 0 to about 1 wt %, about 1 to about 10 wt %, about 1 to about 9 wt %, about 1 to about 8 wt %, about 1 to about 7 wt %, about 1 to about 6 wt %, about 1 to about 5 wt %, about 1 to about 4 wt %, about 1 to about 3 wt %, about 1 to about 2 wt %, about 2 to about 10 wt %, about 2 to about 9 wt %, about 2 to about 8 wt %, about 2 to about 7 wt %, about 2 to about 6 wt %, about 2 to about 5 wt %, about 2 to about 4 wt %, about 2 to about 3 wt %, about 3 to about 10 wt %, about 3 to about 9 wt %, about 3 to about 8 wt %, about 3 to about 7 wt %, about 3 to about 6 wt %, about 3 to about 5 wt %, about 3 to about 4 wt %, about 4 to about 10 wt %, about 4 to about 9 wt %, about 4 to about 8 wt %, about 4 to about 7 wt %, about 4 to about 6 wt %, about 4 to about 5 wt %, about 5 to about 10 wt %, about 5 to about 9 wt %, about 5 to about 8 wt %, about 5 to about 7 wt %, about 5 to about 6 wt %, about 6 to about 10 wt %, about 6 to about 9 wt %, about 6 to about 8 wt %, about 6 to about 7 wt %, about 7 to about 10 wt %, about 7 to about 9 wt %, about 7 wt % to about 8 wt %, about 8 to about 10 wt %, about 8 to about 9 wt %, or about 9 to about 10 wt % ZnO. In some embodiments, the glass-ceramic composition can comprise about 0, >0, 1, 2, 3, 4, 5, 6, 7, 8, 9, or 10 wt % ZnO.

In one or more embodiments, the glass-ceramics herein can comprise from 0 to about 5 wt % $TiO_2$. In some embodiments, the glass-ceramic composition can comprise from 0 to about 5 wt %, 0 to about 4 wt %, 0 to about 3 wt %, 0 to about 2 wt %, 0 to about 1 wt %, about 1 to about 5 wt %, about 1 to about 4 wt %, about 1 to about 3 wt %, about 1 to about 2 wt %, about 2 to about 5 wt %, about 2 to about 4 wt %, about 2 to about 3 wt %, about 3 to about 5 wt %, about 3 to about 4 wt %, or about 4 to about 5 wt % $TiO_2$. In some embodiments, the glass-ceramic composition can comprise about 0, >0, 1, 2, 3, 4, or 5 wt % $TiO_2$.

In one or more embodiments, the glass-ceramics herein can comprise from 0 to about 0.4 wt % $CeO_2$. In some embodiments, the glass-ceramic composition can comprise from 0 to about 0.4 wt %, 0 to about 0.3 wt %, 0 to about 0.2 wt %, 0 to about 0.1 wt %, about 0.1 to about 0.4 wt %, about 1 to about 0.3 wt %, about 1 to about 0.2 wt %, about 0.2 to about 0.4 wt %, about 0.2 to about 0.3 wt %, or about 0.3 to about 0.4 wt % $CeO_2$. In some embodiments, the glass-ceramic composition can comprise about 0, >0, 0.1, 0.2, 0.3, or 0.4 wt % $CeO_2$.

In one or more embodiments, the glass-ceramics herein can comprise from 0 to about 0.5 wt % $SnO_2$. In some embodiments, the glass-ceramic composition can comprise from 0 to about 0.5 wt %, 0 to about 0.4 wt %, 0 to about 0.3 wt %, 0 to about 0.2 wt %, 0 to about 0.1 wt %, about 0.05 to about 0.5 wt %, 0.05 to about 0.4 wt %, 0.05 to about 0.3 wt %, 0.05 to about 0.2 wt %, 0.05 to about 0.1 wt %, about 0.1 to about 0.5 wt %, about 0.1 to about 0.4 wt %, about 0.1 to about 0.3 wt %, about 0.1 to about 0.2 wt %, about 0.2 to about 0.5 wt %, about 0.2 to about 0.4 wt %, about 0.2 to about 0.3 wt %, about 0.3 to about 0.5 wt %, about 0.3 to about 0.4 wt %, or about 0.4 to about 0.5 wt % $SnO_2$. In some embodiments, the glass-ceramic composition can comprise about 0, >0, 0.05, 0.1, 0.2, 0.3, 0.4, or 0.5 wt % $SnO_2$.

In some embodiments, the sum of the weight percentage of $P_2O_5$ and $ZrO_2$ in the glass-ceramics disclosed herein can be greater than or equal to about 3 wt %, 4 wt %, or 5 wt % to increase nucleation. An increase in nucleation can lead to the production of finer grains.

As a result of the raw materials and/or equipment used to produce the glass-ceramic composition of the present disclosure, certain impurities or components that are not intentionally added, can be present in the final glass-ceramic composition. Such materials are present in the glass-ceramic composition in minor amounts and are referred to herein as "tramp materials."

As used herein, a glass-ceramic composition having 0 wt % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts. Tramp compounds that may be found in glass-ceramic embodied herein include, but are not limited to, $Na_2O$, $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, sulfur-based compounds, such as sulfates, halogens, or combinations thereof.

In some embodiments, antimicrobial components may be added to the glass-ceramic composition. Antimicrobial components that may be added to the glass-ceramic include, but are not limited to, Ag, AgO, Cu, CuO, $Cu_2O$, and the like. In some embodiments, the concentrations of the antimicrobial components are kept at a level of about 3, 2, 1, or 0.5, >0 wt %. In some embodiments, the antimicrobial components is from >0 to about 3 wt %. In some embodiments, the antimicrobial components is from >0 to about 1 wt %.

In some embodiments, the glass-ceramic may further include a chemical fining agent. Such fining agents include, but are not limited to, $SnO_2$, $As_2O_3$, $Sb_2O_3$, F, Cl and Br. In some embodiments, the concentrations of the chemical fining agents are kept at a level of 3, 2, 1, or 0.5, >0 wt %. In some embodiments, the fining agent amount is from >0 to about 3 wt %. Chemical fining agents may also include $CeO_2$, $Fe_2O_3$, and other oxides of transition metals, such as $MnO_2$. These oxides may introduce unwanted color to the glass-ceramic via visible absorptions in their final valence state(s) in the glass, and thus, when present, their concentration is usually kept at a level of 0.5, 0.4, 0.3, 0.2, 0.1 or >0 wt %.

The glass-ceramics can also contain $SnO_2$ either as a result of Joule melting using tin-oxide electrodes, through the batching of tin containing materials, e.g., $SnO_2$, SnO, $SnCO_3$, $SnC_2O_2$, etc., or through addition of $SnO_2$ as an agent to adjust various physical, melting, color, or forming attributes. The glass-ceramic can comprise from 0 to about 3 wt %, 0 to about 2 wt %, 0 to about 1 wt %, 0 to 0.5 wt %, or 0 to 0.1 wt % $SnO_2$.

In some embodiments, the glass-ceramic can be substantially free of $Sb_2O_3$, $As_2O_3$, or combinations thereof. For example, the glass-ceramic can comprise 0.05 weight percent or less of $Sb_2O_3$ or $As_2O_3$ or a combination thereof, the glass-ceramic may comprise 0 wt % of $Sb_2O_3$ or $As_2O_3$ or a combination thereof, or the glass-ceramic may be, for example, free of any intentionally added $Sb_2O_3$, $As_2O_3$, or combinations thereof.

Additional components can be incorporated into the glass-ceramic compositions to provide additional benefits or alternatively, can further comprise contaminants typically found in commercially-prepared glass. For example, additional components can be added to adjust various physical, melting, and forming attributes. The glass-ceramics, according to some embodiments, can also include various contaminants associated with batch materials and/or introduced into the glass by the melting, fining, and/or forming equipment used to produce the glass-ceramic (e.g., $ZrO_2$). In some embodiments, the glass-ceramic may comprise one or more compounds useful as ultraviolet radiation absorbers. In some embodiments, the glass-ceramic can comprise 3 wt % or less $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $Fe_2O_3$, $CeO_2$, or combinations thereof. In some embodiments, the glass-ceramic can comprise from 0 to about 3 wt %, 0 to about 2 wt %, 0 to about 1 wt %, 0 to 0.5 wt %, 0 to 0.1 wt %, 0 to 0.05 wt %, or 0 to 0.01 wt % $TiO_2$, MnO, ZnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$ or combinations thereof.

In some embodiments, the glass-ceramics described herein can be manufactured into sheets via processes, including but not limited to, slot draw, float, rolling, and other sheet-forming processes known to those skilled in the art. Alternatively, glass-ceramic compositions may be formed via float or rolling processes known in the art. In some embodiments, the glass-ceramic can be provided as a sheet, which can then be reformed by pressing, blowing, bending, sagging, vacuum forming, or other means into curved or bent pieces of uniform thickness. Reforming can be done before thermally treating or the forming step can also serve as a thermal treatment step where both forming and thermally treating are performed substantially simultaneously.

In some embodiments, the glass-ceramic compositions described here may be compatible with float-type forming processes with an adjustment of the liquidus viscosity. In some embodiments, the glass-ceramic composition can have a liquidus viscosity of from about 1500 P to about 3000 P. In some embodiments, the glass-ceramic composition can have a liquidus viscosity of about 1000, 1200, 1500, 2000, 2500, or 3000 P.

In yet other embodiments, the precursor glass compositions used to form a glass-ceramic can be formulated, for example, so that the glass-ceramic is capable of being chemically strengthened using one or more ion exchange techniques. In such embodiments, ion exchange can occur by subjecting one or more surfaces of such glass-ceramic to one or more ion exchange baths, having a specific composition and temperature, for a specified time period to impart to the one or more surfaces with compressive stress layer(s). The compressive stress layer can include one or more average surface compressive stress (CS), and/or one or more depths of layer.

Methods of making containers discussed herein may include forming a glass material and ceramming the glass material to achieve desired mechanical properties while maintaining optical properties of the glass material. In some embodiments, the method may include molding a glass material into a glass container and ceramming the glass container at a ceramming temperature to crystalize the glass material into a glass-ceramic material, thereby forming a glass-ceramic container. In some embodiments, the method may be devoid of an ion-exchange process, a tempering process, and a lamination process. In some embodiments, the method may include an ion-exchange process. In such embodiments, the glass-ceramic material has a first fracture toughness before the ion-exchange process and a second fracture toughness greater than the first fracture toughness after the ion-exchange process.

In some embodiments, the ceramming temperature may be in the range of 500 degrees C. (° C.) to 900 degrees C. In some embodiments, the ceramming temperature may be about 500 degrees C., 550 degrees C., 600 degrees C., 650 degrees C., 700 degrees C., 750 degrees C., 800 degrees C., 850 degrees C., 900 degrees C., or within any range having two of these values as endpoints. In some embodiments, a glass container may be held at the ceramming temperature for about 4 hours to achieve desired mechanical properties while maintaining optical properties of the glass-ceramic material.

In some embodiments, a glass-ceramic container may be made by a method including molding a glass material into a single monolithic glass container and ceramming the glass container at a ceramming temperature to crystalize the glass material into a glass-ceramic material, thereby forming a glass-ceramic container having at least one, or all, of the following characteristics: (a) transparency in the visible light spectrum (400 nm to 700 nm), (b) a fracture toughness of 1 MPa*m^½ or more, and (c) an exterior surface of the circumferential sidewall is not under compressive stress. In some embodiments, the method may be devoid of a tempering process such that the glass-ceramic container comprises a non-tempered glass-ceramic-material.

Example glass and glass-ceramic compositions (in terms of wt %) and properties for achieving transparent glass-ceramics are set forth in the Table 1 and were determined in accordance with techniques conventional in the glass art. Precursor glasses were formed having the compositions 1-16 listed in Table 1. The precursor glasses were then subjected to a ceramming cycle having a glass homogenization hold at 540° C. for 4 hours, a nucleation hold at 600° C. for 4 hours, and a crystallization hold at a temperature in a range from 630 to 730° C. for 4 hours. The following nomenclature was used in Table 1 to describe the ceramming cycle: glass homogenization temperature-hold time/nucleation temperature-hold time/crystallization temperature-hold time.

Example glass and glass-ceramic compositions (in terms of wt %) and properties for achieving translucent glass-ceramics are set forth in the Table 2 and were determined in accordance with techniques conventional in the glass art. Precursor glasses were formed having the compositions 17-29 listed in Table 2. The precursor glasses were then subjected to a ceramming cycle indicated in Table 2 below.

The liquidus temperature is the temperature where the first crystal is observed in a standard gradient boat liquidus measurement (ASTM C829-81 and it progeny). This involves placing crushed glass particles in a platinum boat, placing the boat in a furnace having a region of gradient temperatures, heating the boat in an appropriate temperature region for 24 or 72 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), in order to observe slower growing phases. The liquidus viscosity in poises was determined from the liquidus temperature and the coefficients of the Fulcher equation.

TABLE 1

| Composition | 1 | 2 | 3 | 4 | 5 | 6 | 7 | 8 |
|---|---|---|---|---|---|---|---|---|
| $SiO_2$ (wt %) | 78.3 | 78.3 | 78.3 | 78.3 | 78.3 | 78.3 | 78.3 | 78.3 |
| $Al_2O_3$ (wt %) | 7.5 | 8.1 | 8.7 | 8.1 | 8.1 | 8.1 | 8.1 | 8.1 |
| $B_2O_3$ (wt %) | 0.0 | 0.2 | 0.4 | 1.0 | 2.0 | 4.0 | 5.0 | 6.0 |
| $Li_2O$ (wt %) | 12.5 | 11.9 | 11.3 | 11.9 | 11.9 | 11.9 | 11.9 | 11.9 |
| $Na_2O$ (wt %) | 1.7 | 1.7 | 1.7 | 1.7 | 1.7 | 1.7 | 1.7 | 1.7 |
| $K_2O$ (wt %) | 0.0 | 0.0 | 0.0 | 0.0 | 0.0 | 0.0 | 0.0 | 0.0 |
| ZnO (wt %) | 0.0 | 0.0 | 0.0 | 0.0 | 0.0 | 0.0 | 0.0 | 0.0 |
| $ZrO_2$ (wt %) | 4.0 | 4.0 | 4.0 | 4.0 | 4.0 | 4.0 | 4.0 | 4.0 |
| $P_2O_5$ (wt %) | 2.0 | 2.2 | 2.4 | 2.2 | 2.2 | 2.2 | 2.2 | 2.2 |
| Ceramming cycle | 540° C.-4 hr/ 600° C.-4 hr/ 730° C.-4 hr | 540° C.-4 hr/ 600° C.-4 hr/ 710° C.-4 hr | 540° C.-4 hr/ 600° C.-4 hr/ 730° C.-4 hr | 540° C.-4 hr/ 600° C.-4 hr/ 690° C.-4 hr | 540° C.-4 hr/ 600° C.-4 hr/ 650° C.-4 hr | 540° C.-4 hr/ 600° C.-4 hr/ 630° C.-4 hr | 540° C.-4 hr/ 600° C.-4 hr/ 630° C.-4 hr | 540° C.-4 hr/ 600° C.-4 hr/ 630° C.-4 hr |
| Phase assemblage | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate |
| Appearance | Slight hazy, transparent | Clear, transparent | Slight hazy, transparent | Clear, transparent | Clear, transparent | Slight hazy, transparent | Slight hazy, transparent | Slight hazy, transparent |
| Liquidus temperature (° C.) | 1030 | 1050 | 1070 | — | — | — | — | — |
| Liquidus viscosity (poise) | 3700 | 3800 | 3800 | — | — | — | — | — |

| Composition | 9 | 10 | 11 | 12 | 13 | 14 | 15 | 16 |
|---|---|---|---|---|---|---|---|---|
| $SiO_2$ (wt %) | 76.3 | 74.3 | 72.3 | 70.3 | 78.3 | 78.3 | 78.3 | 78.3 |
| $Al_2O_3$ (wt %) | 10.1 | 12.1 | 14.1 | 16.1 | 8.1 | 8.1 | 8.1 | 8.1 |
| $B_2O_3$ (wt %) | 0.2 | 0.2 | 0.2 | 0.2 | 2.0 | 2.0 | 2.0 | 2.0 |
| $Li_2O$ (wt %) | 11.9 | 11.9 | 11.9 | 11.9 | 11.9 | 11.9 | 11.9 | 11.9 |
| $Na_2O$ (wt %) | 1.7 | 1.7 | 1.7 | 1.7 | 0.0 | 0.0 | 0.0 | 0.0 |
| $K_2O$ (wt %) | 0.0 | 0.0 | 0.0 | 0.0 | 1.5 | 3.0 | 0.0 | 0.0 |
| ZnO (wt %) | 0.0 | 0.0 | 0.0 | 0.0 | 0.0 | 0.0 | 1.5 | 3.0 |
| $ZrO_2$ (wt %) | 4.0 | 4.0 | 4.0 | 4.0 | 4.0 | 4.0 | 4.0 | 4.0 |
| $P_2O_5$ (wt %) | 2.2 | 2.2 | 2.2 | 2.2 | 2.2 | 2.2 | 2.2 | 2.2 |
| Ceramming cycle | 540° C.-4 hr/ 600° C.-4 hr/ 710° C.-4 hr | 540° C.-4 hr/ 600° C.-4 hr/ 710° C.-4 hr | 540° C.-4 hr/ 600° C.-4 hr/ 710° C.-4 hr | 540° C.-4 hr/ 600° C.-4 hr/ 710° C.-4 hr | 540° C.-4 hr/ 600° C.-4 hr/ 690° C.-4 hr | 540° C.-4 hr/ 600° C.-4 hr/ 690° C.-4 hr | 540° C.-4 hr/ 600° C.-4 hr/ 690° C.-4 hr | 540° C.-4 hr/ 600° C.-4 hr/ 690° C.-4 hr |
| Phase assemblage | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate | Petalite, lithium disilicate |
| Appearance | Slight haze, transparent | Hazy, transparent | Translucent white | Translucent creamy white | Clear, transparent | Slight hazy, transparent | Slight hazy, transparent | Translucent white |
| Liquidus temperature (° C.) | — | — | — | — | — | — | — | — |
| Liquidus viscosity (poise) | — | — | — | — | — | — | — | — |

TABLE 2

| Composition | 17 | 18 | 19 | 20 | 21 | 22 | 23 |
|---|---|---|---|---|---|---|---|
| $SiO_2$ (wt %) | 78.3 | 78.3 | 78.3 | 78.3 | 78.3 | 78.3 | 76.3 |
| $Al_2O_3$ (wt %) | 10.5 | 9.3 | 9.3 | 9.3 | 7.5 | 8.1 | 8.7 |
| $B_2O_3$ (wt %) | 1 | 0.6 | 0.6 | 0.6 | 0.0 | 0.2 | 0.4 |
| $Li_2O$ (wt %) | 9.5 | 10.7 | 10.7 | 10.7 | 12.5 | 11.9 | 11.3 |
| $Na_2O$ (wt %) | 1.7 | 1.7 | 1.7 | 1.7 | 1.7 | 1.7 | 1.7 |

TABLE 2-continued

| | | | | | | | |
|---|---|---|---|---|---|---|---|
| K$_2$O (wt %) | 0.0 | 0.0 | 0.0 | 0.0 | 0.0 | 0.0 | 0.0 |
| ZnO (wt %) | 0.0 | 0.0 | 0.0 | 0.0 | 0.0 | 0.0 | 0.0 |
| ZrO$_2$ (wt %) | 4.0 | 4.0 | 6.0 | 8.0 | 4.0 | 4.0 | 4.0 |
| P$_2$O$_5$ (wt %) | 3.0 | 2.0 | 2.0 | 2.0 | 2.2 | 2.2 | 2.4 |
| Ceramming cycle | 700° C.-0.5 hr/ 800° C.-0.5 hr | 700° C.-0.5 hr/ 800° C.-0.5 hr | 700° C.-0.5 hr/ 800° C.-0.5 hr | 700° C.-0.5 hr/ 800° C.-0.5 hr | 540° C.-4 hr/ 600° C.-4 hr/ 730° C.-4 hr | 540° C.-4 hr/ 600° C.-4 hr/ 740° C.-4 hr | 540° C.-4 hr/ 600° C.-4 hr/ 730° C.-4 hr |
| Phase assemblage | Petalite, lithium disilicate, lithiophosphate | Petalite, lithium disilicate, lithiophosphate | Petalite, lithium disilicate, β-quartz lithiophosphate | Petalite, lithium disilicate, cristobalite, lithiophosphate | Petalite, lithium disilicate | Petalite, lithium disilicate, β-quartz | Petalite, lithium disilicate |
| Appearance | Translucent white | Translucent white | Translucent white | Translucent white | Slight hazy, transparent | Transparent | Slight hazy, transparent |
| Liquidus temperature (° C.) | 1070 | 1060 | 1055 | 1220 | 1030 | 1050 | 1070 |
| Liquidus viscosity (poise) | 9800 | 5900 | 6100 | 880 | 3700 | 3800 | 3800 |

| Composition | 24 | 25 | 26 | 27 | 28 | 29 |
|---|---|---|---|---|---|---|
| SiO$_2$ (wt %) | 72.3 | 78.3 | 78.3 | 78.3 | 78.3 | 78.3 |
| Al$_2$O$_3$ (wt %) | 14.1 | 10.5 | 8.1 | 10.1 | 11.1 | 12.1 |
| B$_2$O$_3$ (wt %) | 0.2 | 1 | 0.2 | 0.2 | 0.2 | 0.2 |
| Li$_2$O (wt %) | 11.9 | 9.5 | 11.9 | 11.9 | 11.9 | 11.9 |
| Na$_2$O (wt %) | 1.7 | 0 | 0 | 0 | 0 | 0 |
| K$_2$O (wt %) | 0.0 | 1.7 | 1.7 | 1.7 | 1.7 | 1.7 |
| ZnO (wt %) | 0.0 | 0 | 0 | 0 | 0 | 0 |
| ZrO$_2$ (wt %) | 4.0 | 4 | 4 | 4 | 4 | 4 |
| P$_2$O$_5$ (wt %) | 2.2 | 3 | 2.2 | 2.2 | 2.2 | 2.2 |
| Ceramming cycle | 540° C.-4 hr/ 600° C.-4 hr/ 630° C.-4 hr | 540° C.-4 hr/ 600° C.-4 hr/ 680° C.-2 hr | 540° C.-4 hr/ 600° C.-4 hr/ 680° C.-2 hr | 540° C.-4 hr/ 600° C.-4 hr/ 680° C.-2 hr | 540° C.-4 hr/ 600° C.-4 hr/ 680° C.-2 hr | 540° C.-4 hr/ 600° C.-4 hr/ 680° C.-2 hr |
| Phase assemblage | β-quartz, petalite, lithium metasilicate | — | — | — | — | — |
| Appearance | Translucent white | Translucent white | Transparent | Transparent | Slightly hazy, transparent | Slightly hazy, transparent |
| Liquidus temperature (° C.) | — | — | — | — | — | — |
| Liquidus viscosity (poise) | — | — | — | — | — | — |

As used herein the term "glass" is meant to include any material made at least partially of glass, including glass and glass-ceramics. "Glass-ceramics" include materials produced through controlled crystallization of glass. In embodiments, glass-ceramics have about 30% to about 90% crystallinity.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

The term "wherein" is used as an open-ended transitional phrase, to introduce a recitation of a series of characteristics of the structure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A glass-ceramic article comprising:
a body formed of a glass-ceramic material, the body comprising:
a primary glass-ceramic region comprising primary crystal phases of the glass-ceramic material and a fracture toughness of X MPa*m^½, wherein the primary crystal phases of the glass-ceramic material are optically transparent, and
a secondary glass-ceramic region comprising secondary crystal phases of the glass-ceramic material and a fracture toughness of Y MPa*m^½, wherein the secondary crystal phases of the glass-ceramic material are not optically transparent, and wherein Y is greater than X.

2. The glass-ceramic article of claim 1, wherein the primary crystal phases comprise petalite and lithium disilicate.

3. The glass-ceramic article of claim 1, wherein the secondary crystal phases comprise beta-spodumene, lithium disilicate, and zirconia.

4. The glass-ceramic article of claim 1, wherein X is 0.9 MPa*m^½ or more.

5. The glass-ceramic article of claim 1, wherein Y is 2 MPa*m^½ or more.

6. The glass-ceramic article of claim 1, wherein Y is at least two times more than X.

7. The glass-ceramic article of claim 1, wherein the primary crystal phases of the glass-ceramic material comprise a first average grain size and wherein the secondary crystal phases of the glass-ceramic material comprise a second average grain size larger than the first average grain size.

8. The glass-ceramic article of claim 1, wherein the secondary glass-ceramic region comprises a cross-sectional area defined by the thickness of the secondary glass-ceramic region measured between an inner surface and an outer surface of the body, and wherein a maximum thickness of an area defined by the secondary crystal phases in the cross-sectional area is equal to a maximum thickness of the cross-sectional area.

9. The glass-ceramic article of claim 1, wherein the secondary glass-ceramic region comprises a cross-sectional area defined by the thickness of the secondary glass-ceramic region measured between an inner surface and an outer surface of the body, and wherein a maximum thickness of an area defined by the secondary crystal phases in the cross-sectional area is less than a maximum thickness of the cross-sectional area.

10. The glass-ceramic article of claim 1, wherein the secondary glass-ceramic region comprises a cross-sectional area defined by the thickness of the secondary glass-ceramic region measured between an inner surface and an outer surface of the body, and the cross-sectional area comprises a first area defined by the primary crystal phases of the glass-ceramic material and a second area defined by the secondary crystal phases of the glass-ceramic material.

11. The glass-ceramic article of claim 10, wherein the second area is central area disposed between portions of the first area.

12. The glass-ceramic article of claim 1, wherein the body consists essentially of the primary crystal phases of the glass-ceramic material and the secondary crystal phases of the glass-ceramic material.

13. The glass-ceramic article of claim 1, wherein the body comprises less than 25 wt % amorphous phase of the glass-ceramic material.

14. The glass-ceramic article of claim 1, wherein the body comprises a hollow interior defined by a circumferential sidewall, and wherein the secondary glass-ceramic region defines a circumferential volume of the circumferential sidewall.

15. The glass-ceramic article of claim 14, comprising at least two separate secondary glass-ceramic regions, each secondary glass-ceramic region defining a circumferential volume of the circumferential sidewall.

16. The glass-ceramic article of claim 15, wherein, with the exception of the secondary glass-ceramic regions, the circumferential sidewall is defined by the primary glass-ceramic region.

17. The glass-ceramic article of claim 1, wherein the body comprises a plate defined by a top surface, a bottom surface, and a perimeter edge, and wherein the secondary glass-ceramic region defines the perimeter edge.

18. The glass-ceramic article of claim 17, wherein the plate is a cover substrate for an electronic display.

19. A glass-ceramic container, comprising:
a body formed of a glass-ceramic material and comprising a hollow interior defined by a circumferential sidewall, an open top end, and a bottom end, wherein the circumferential sidewall comprises:

a primary circumferential glass-ceramic region comprising primary crystal phases of the glass-ceramic material and a fracture toughness of X MPa*m^½, wherein the primary crystal phases of glass-ceramic material are optically transparent, and a secondary circumferential glass-ceramic region comprising secondary crystal phases of the glass-ceramic material and a fracture toughness of Y MPa*m^½, wherein the secondary crystal phases of the glass-ceramic material are not optically transparent, and wherein Y is greater than X.

20. A glass-ceramic container, comprising:
a body formed of a glass-ceramic material and comprising a hollow interior defined by a circumferential sidewall formed symmetrically around a central vertical axis, an open top end, and a bottom end,
wherein the circumferential sidewall comprises:

a peripheral region defined by a volume of the circumferential sidewall, the peripheral region comprising secondary crystal phases of the glass-ceramic material and a fracture toughness of Y MPa*m^½, wherein the secondary crystal phases of the glass-ceramic material are not optically transparent, and a contracted region defined by a volume of the circumferential sidewall disposed closer to the central axis than the peripheral region and comprising primary crystal phases of the glass-ceramic material and a fracture toughness of X MPa*m^½, wherein the primary crystal phases of glass-ceramic material are optically transparent, and wherein Y is greater than X.

\* \* \* \* \*